(12) United States Patent
Gracia-Tinedo et al.

(10) Patent No.: US 12,489,810 B1
(45) Date of Patent: Dec. 2, 2025

(54) METHOD AND SYSTEM FOR POLICY-DRIVEN CONSUMER GROUPS FOR STREAMING STORAGE SYSTEMS

(71) Applicant: Dell Products L.P., Round Rock, TX (US)

(72) Inventors: Raúl Gracia-Tinedo, Barcelona (ES); Éric Caron, Orléans (CA)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/680,230

(22) Filed: May 31, 2024

(51) Int. Cl.
*H04L 67/1008* (2022.01)

(52) U.S. Cl.
CPC ................. *H04L 67/1008* (2013.01)

(58) Field of Classification Search
CPC .................................................. H04L 67/1008
See application file for complete search history.

(56) References Cited

U.S. PATENT DOCUMENTS

| | | | |
|---|---|---|---|
| 12,062,367 B1 * | 8/2024 | Huynh ................... | G10L 15/063 |
| 2010/0180029 A1 * | 7/2010 | Fourman ............. | G06F 16/9535 709/225 |
| 2021/0320871 A1 * | 10/2021 | Savarese ............. | H04L 63/1425 |

OTHER PUBLICATIONS

Ezzeddine et al., "Cost-Efficient and Latency-Aware Event Consuming in Workload-Skewed Distributed Event Queues", HAL open science, 6th International Conference on Cloud and Big Data Computing (ICCBDC'2022), Aug. 2022, Birmingham, United Kingdom, hal-03778255, Aug. 18-20, 2022 (10 pages).

(Continued)

*Primary Examiner* — Benjamin M Thieu
(74) *Attorney, Agent, or Firm* — Chamberlain, Hrdlicka, White, Williams & Aughtry; Aly Z. Dossa

(57) ABSTRACT

A method for managing a reader group (RG) includes: obtaining a first metadata, a second metadata, and a policy, in which a first reader (FR) and a second reader (SR) are a part of the RG; analyzing the obtained metadata to infer a user's goal and information; distributing, based on the goal and information, a first segment to the FR and a second segment to the SR; making a first determination that a number of readers in the RG is changed; making a second determination that a third reader (TR) is added to the RG; obtaining a third metadata of the FR, a fourth metadata of the SR, and a fifth metadata of the TR; analyzing the obtained metadata to infer second information; and re-distributing, based on the goal and the second information, the first segment to the SR and second segment to the TR.

20 Claims, 7 Drawing Sheets

(56) References Cited

OTHER PUBLICATIONS

Gracia-Tinedo et al., "Practical Storage-Compute Elasticity for Stream Data Processing", 24th International Middleware Conference Industrial Track (Middleware Industrial Track '23), Dec. 11-15, 2023, Bologna, Italy, pp. 1-7 (7 pages).
Gracia-Tinedo et al., "Pravega: A Tiered Storage System for Data Streams", 24th International Middleware Conference (Middleware '23), Dec. 11-15, 2023, Bologna, Italy, pp. 165-177 (13 pages).
Wu et al., "Performance Prediction for the Apache Kafka Messaging System", Conference Paper, DOI: 10.1109/HPCC/SmartCity/DSS. 2019.00036, Aug. 2019 (9 pages).
Raptis et al., "On Efficiently Partitioning a Topic in Apache Kafka", Institute of Informatics and Telematics, National Research Council, arXiv:2205.09415v1 [cs.NI], Pisa, Italy, May 19, 2022 (8 pages).
Wang et al., "Consistency and Completeness Rethinking Distributed Stream Processing in Apache Kafka", Industrial Track Paper, SIGMOD, Jun. 20-25, 2021, Virtual Event, China, pp. 2602-2613 (12 pages).

\* cited by examiner

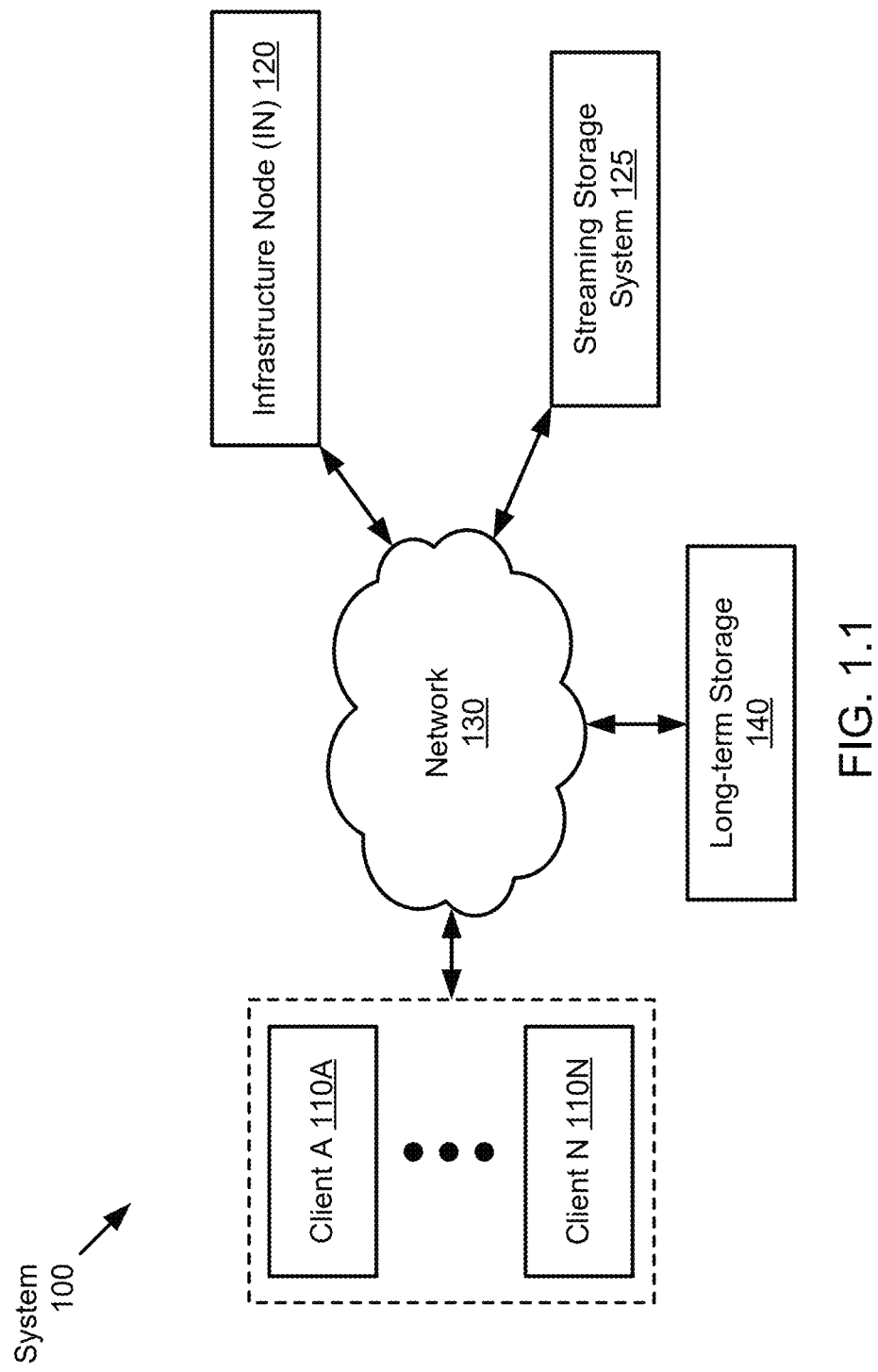
FIG. 1.1

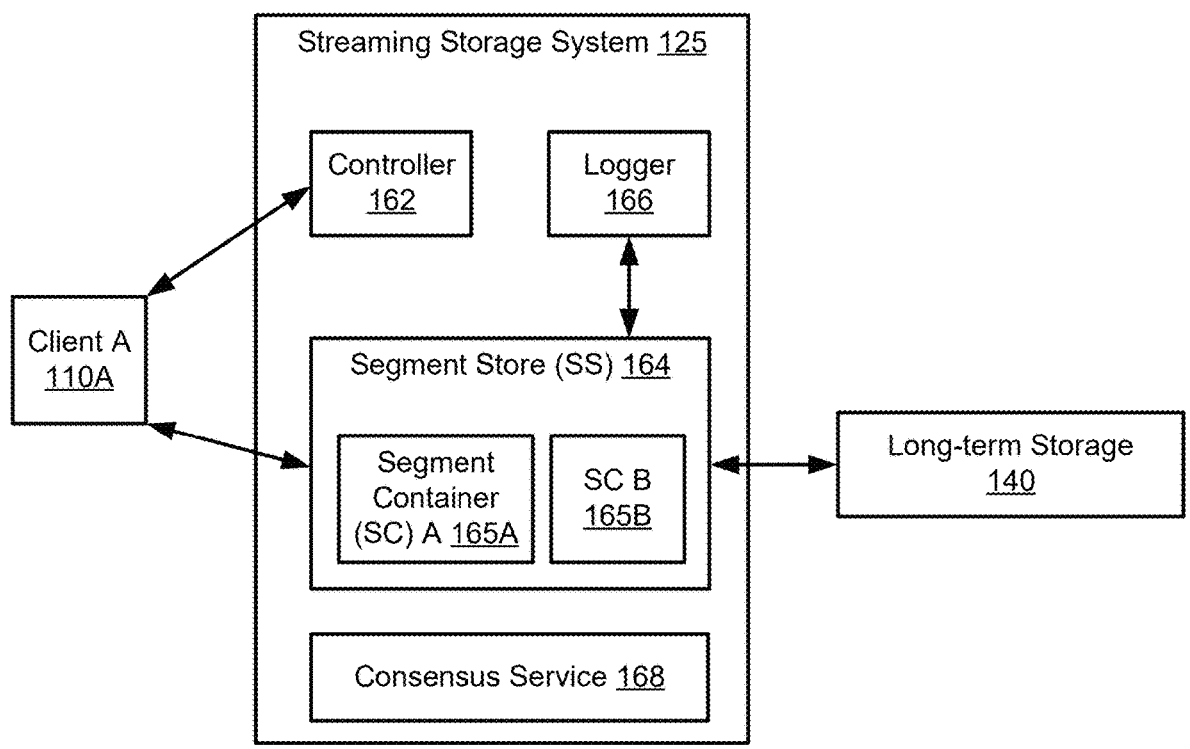
FIG. 1.2

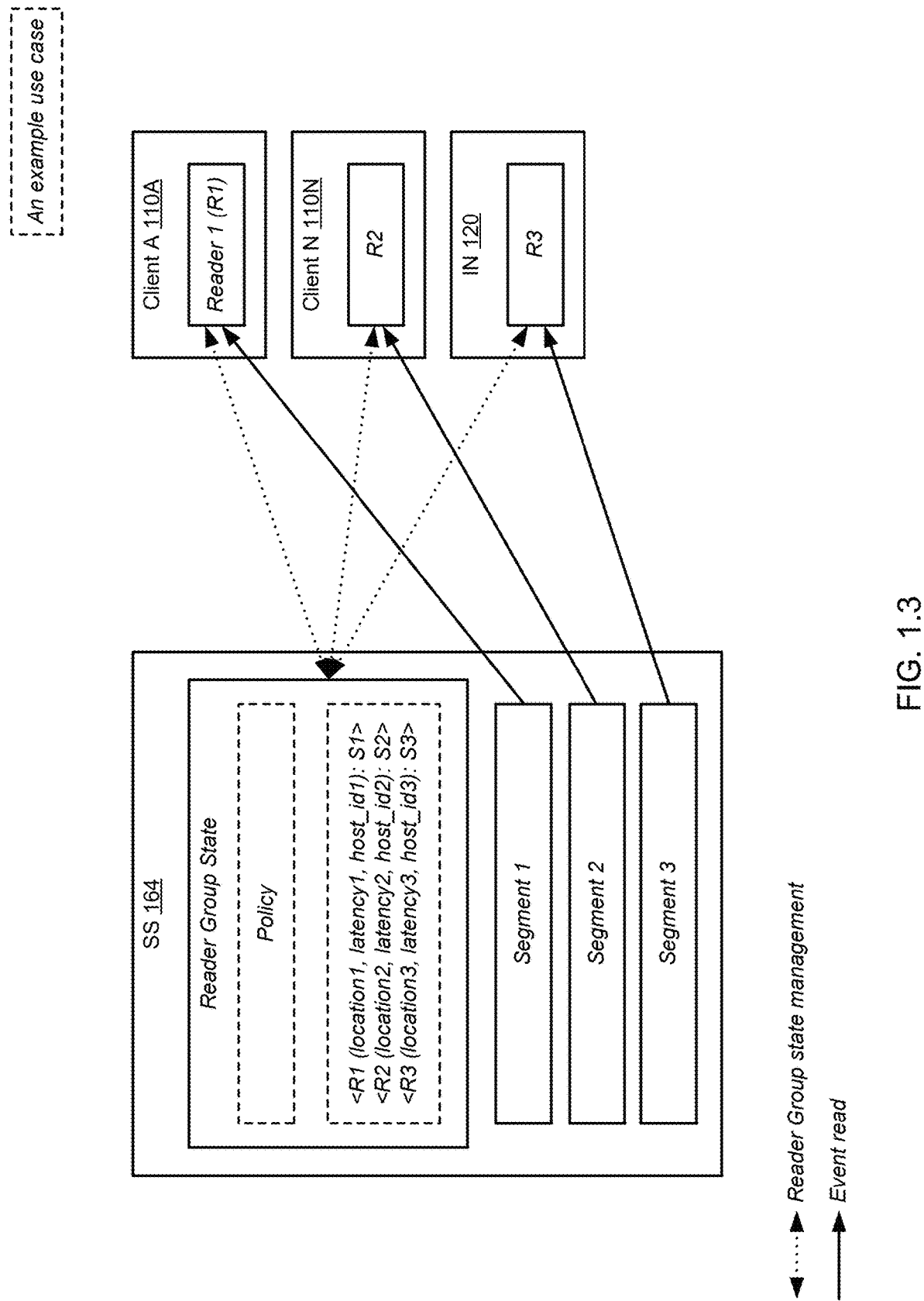
FIG. 1.3

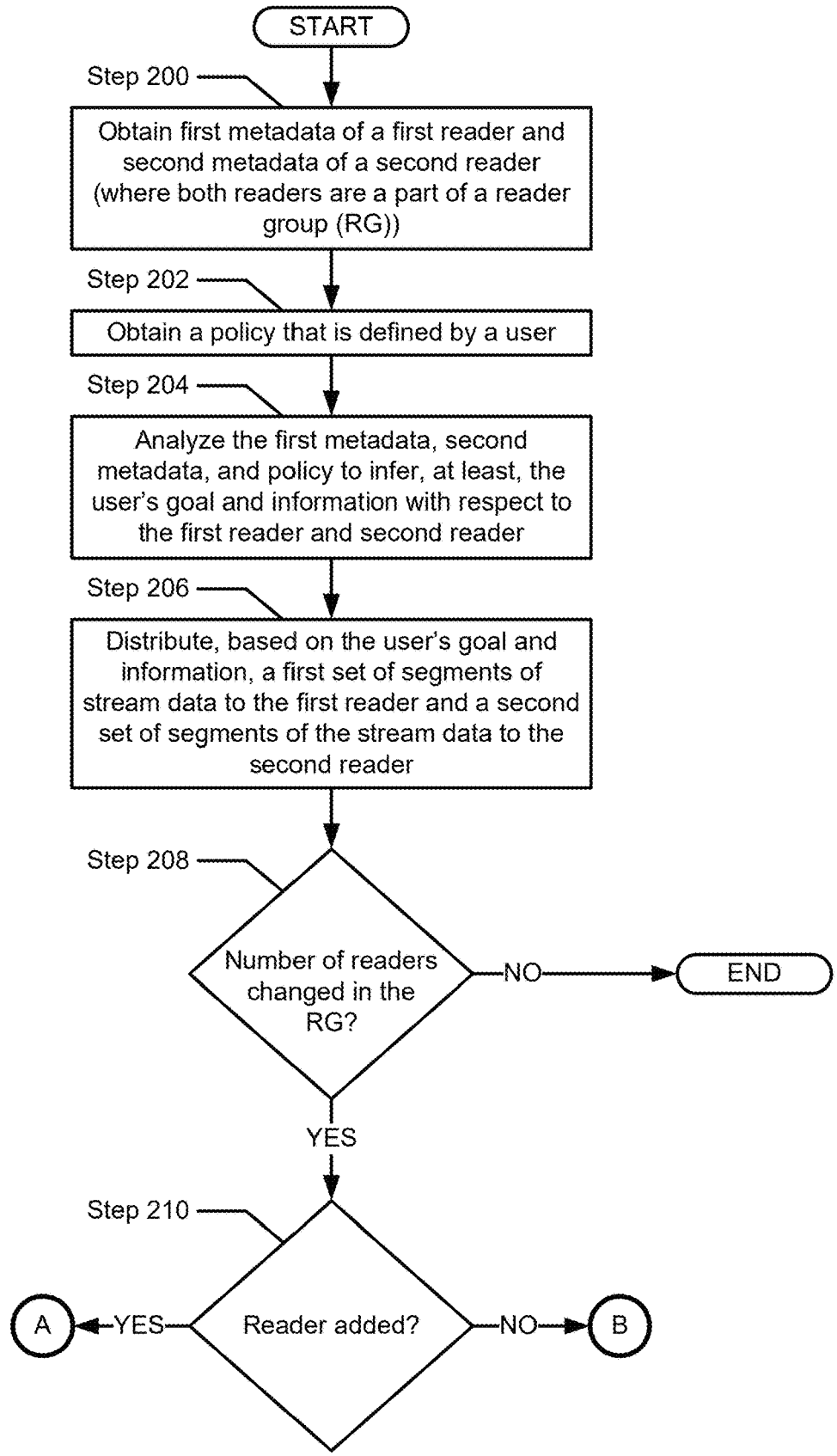
FIG. 2.1

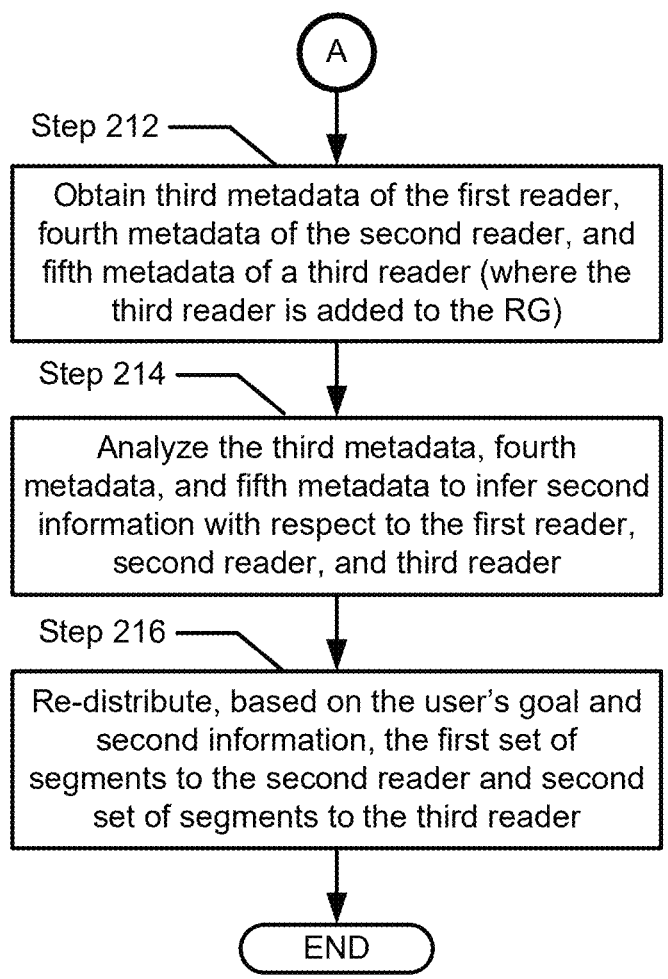
FIG. 2.2

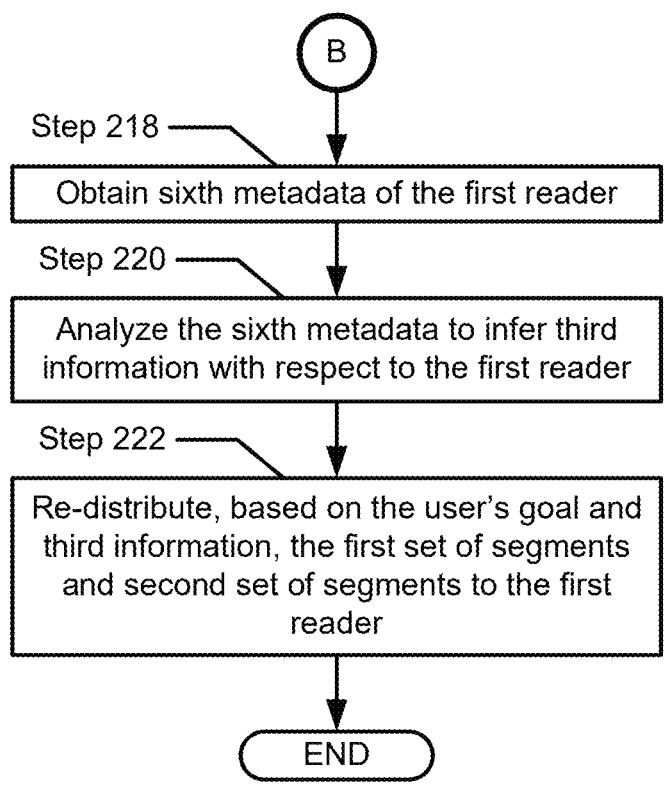
FIG. 2.3

METHOD AND SYSTEM FOR POLICY-DRIVEN CONSUMER GROUPS FOR STREAMING STORAGE SYSTEMS

BACKGROUND

Streaming applications are applications that deal with a large amount of data arriving continuously. In processing streaming application data, the data can arrive late, arrive out of order, and the processing can undergo failure conditions. It can be appreciated that tools designed for previous generations of big data applications may not be ideally suited to process and store streaming application data.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example, and are not meant to limit the scope of the claims.

FIG. 1.1 shows a diagram of a system in accordance with one or more embodiments disclosed herein.

FIG. 1.2 shows a diagram of a streaming storage system in accordance with one or more embodiments disclosed herein.

FIG. 1.3 shows an example use case in accordance with one or more embodiments disclosed herein.

FIGS. 2.1-2.3 show a method for managing policy-driven reader groups in accordance with one or more embodiments disclosed herein.

DETAILED DESCRIPTION

Figure 3:
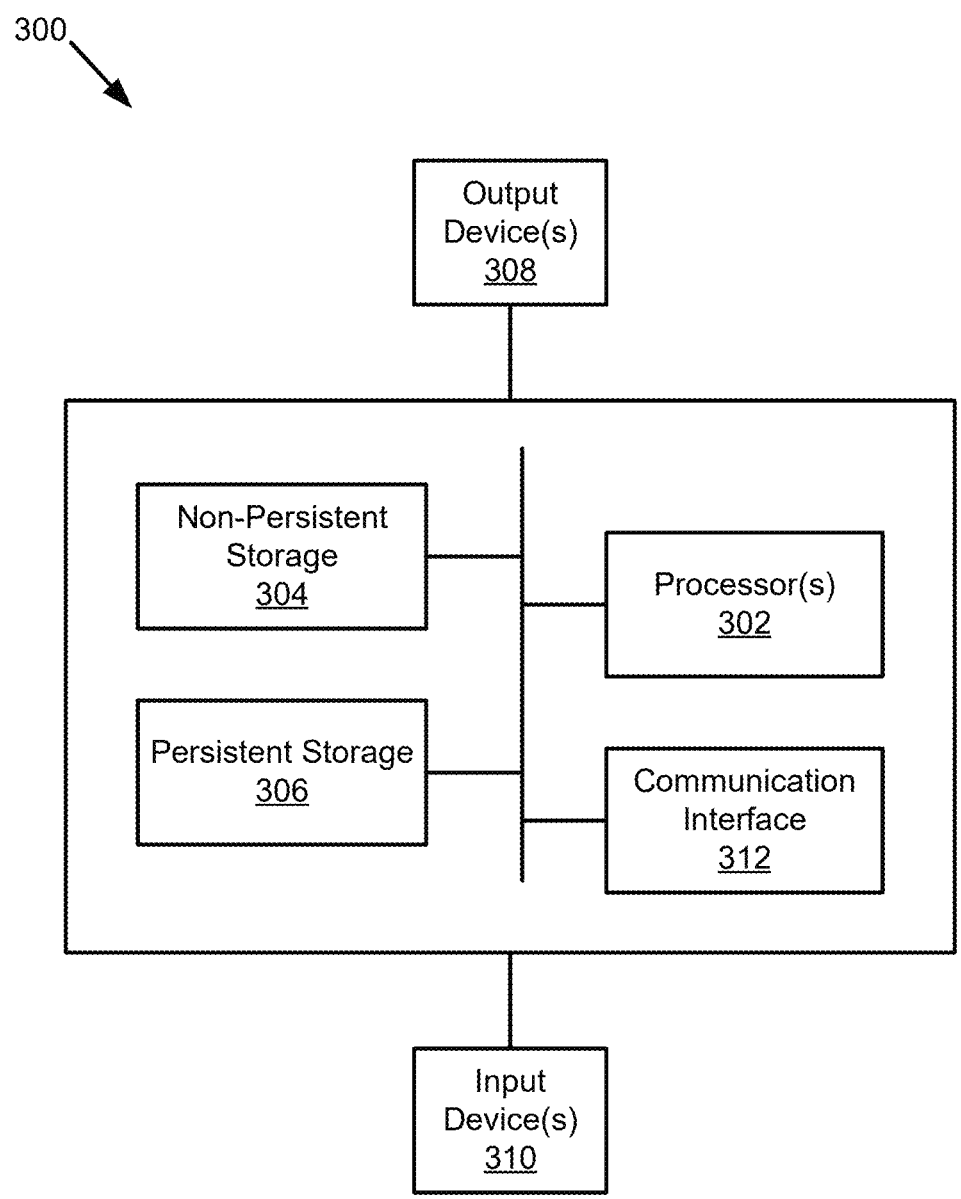
FIG. 3 shows a diagram of a computing device in accordance with one or more embodiments disclosed herein.

Specific embodiments disclosed herein will now be described in detail with reference to the accompanying figures. In the following detailed description of the embodiments disclosed herein, numerous specific details are set forth in order to provide a more thorough understanding of one or more embodiments disclosed herein. However, it will be apparent to one of ordinary skill in the art that the one or more embodiments disclosed herein may be practiced without these specific details. In other instances, well-known features have not been described in detail to avoid unnecessarily complicating the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase "operatively connected" may refer to any direct connection (e.g., wired directly between two devices or components) or indirect connection (e.g., wired and/or wireless connections between any number of devices or components connecting the operatively connected devices). Thus, any path through which information may travel may be considered an operative connection.

Over the years, event storage systems (or streaming storage services/systems) (e.g., Apache Kafka, Apache Pulsar, Dell Pravega, etc.) are becoming increasingly popular to manage and store data events in different scenarios (e.g., Internet of Things (IoT), telecommunication, Edge deployments, etc.). These systems allow users/customers to write small events with low-latency and read events back both in real-time and batch for processing. In this manner, streaming storage systems are becoming increasingly used across the industry.

In most cases, streaming storage systems share a common goal, which is allowing applications to reliably store and read data with high-performance. To this end, such systems allow multiple writers and readers to work in parallel on a given topic (or stream). When reading a stream, most streaming storage systems provide the notion of a reader group (or consumer group). This abstraction allows one or more distributed reader processes to coordinate the task of reading stream events (e.g., the consumption of data from a set of readers across one or more stream events (or streams)) in a consistent manner (e.g., avoid missing events, avoid reading an event twice within a reading group, etc.) and balance the workload across readers (in the reader group). Normally, the distribution of a reading process (across readers) is based on how stream partitions/segments are distributed across readers.

However, little attention has been given to the distribution of workload/segments across readers (in a reader group) beyond ensuring correctness (e.g., guaranteeing that there are no duplicate or missing events in a stream while processing) and, in some cases, a best-effort workload balancing across the readers. Said another way, little work has been performed to explore more advanced reader group policies beyond achieving a "best-effort" workload balancing across the readers.

For at least the reasons discussed above and without requiring resource (e.g., time, engineering, etc.) intensive efforts, a fundamentally different framework/approach is needed (e.g., a framework for achieving policy-driven goals for reader groups in streaming storage systems, in which the framework considers exploiting metadata from readers so that models/algorithms can achieve the goals based on that metadata).

Embodiments disclosed herein relate to methods and systems for managing policy-driven reader groups for streaming storage systems. As a result of the processes discussed below, one or more embodiments disclosed herein advantageously ensure that: (i) the reader group abstraction is augmented with metadata (obtained from readers); (ii) based on the metadata, high-level policies (that dictate how readers in a reader group distribute the workload to achieve a specific goal) are applied; (iii) for a better user experience, an advanced policy-driven mechanism/platform to define readers' behavior in a reader group is provided to users; (iv) the framework is applicable to data stream processing pipelines consisting of a streaming storage system (as a data ingestion service) and a stream processing engine (or other types of applications) to perform computations; (v) users are enabled to define policies at the reader group level based on some metadata associated with readers (of a related reader group) so that streaming applications (e.g., readers) can achieve specific goals (e.g., specific user-defined policy goals) when consuming stream data; (vi) custom metadata can be associated with a specific reader (in a reader group), which is the foundation for building intelligence in how readers (in the reader group) should read stream data; (vii) to satisfy a specific policy goal, intelligence (e.g., a distributed model) is added to the reader group distribution of workload across readers (where the policy has control about the way the readers read stream data); (viii) the benefits of the framework can be applied to legacy applications (e.g., advanced stream processing engines, advanced microservices, etc.) transparently so that these applications can achieve reader group level goals without changing the corresponding application code; (ix) from a difference perspective (comparing to the perspective described in (viii)), a consumer application (or a stream processing engine) can be aware of a corresponding reader group policy being used and act accordingly to contribute towards the same goal; (x) additional interplay opportunities between reader groups and streaming applications are provided (where, based on reader metadata, the framework enables defining policies in reader groups and the logic/intelligence to achieve them); and/or (xi) for a better user experience, users can employ the framework to co-design reader group behavior based on already existing auto-scaling mechanism at the stream processing application level.

The following describes various embodiments disclosed herein.

FIG. 1.1 shows a diagram of a system (100) in accordance with one or more embodiments disclosed herein. The system (100) includes any number of clients (e.g., Client A (110A), Client N (110N), etc.), a network (130), any number of infrastructure nodes (INs) (e.g., 120), a streaming storage system (125), and a long-term storage (140) (e.g., a tier-2 storage). The system (100) may facilitate the management of stream data from any number of sources (e.g., 110A, 110N, etc.). The system (100) may include additional, fewer, and/or different components without departing from the scope of the embodiments disclosed herein. Each component may be operably/operatively connected to any of the other components via any combination of wired and/or wireless connections. Each component illustrated in FIG. 1.1 is discussed below.

In one or more embodiments, the clients (e.g., 110A, 110N, etc.), the IN (120), the network (130), the streaming storage system (125), and the long-term storage (140) may be (or may include) physical hardware or logical devices, as discussed below. While FIG. 1.1 shows a specific configuration of the system (100), other configurations may be used without departing from the scope of the embodiments disclosed herein. For example, although the clients (e.g., 110A, 110N, etc.) and the IN (120) are shown to be operatively connected through a communication network (e.g., 130), the clients (e.g., 110A, 110N, etc.) and the IN (120) may be directly connected (e.g., without an intervening communication network).

Further, the functioning of the clients (e.g., 110A, 110N, etc.) and the IN (120) is not dependent upon the functioning and/or existence of the other components (e.g., devices) in the system (100). Rather, the clients and the IN may function independently and perform operations locally that do not require communication with other components. Accordingly, embodiments disclosed herein should not be limited to the configuration of components shown in FIG. 1.1.

As used herein, "communication" may refer to simple data passing, or may refer to two or more components coordinating a job. As used herein, the term "data" is intended to be broad in scope. In this manner, that term embraces, for example (but not limited to): a data stream (or stream data) (including multiple events, each of which is associated with a routing key) that is continuously produced by streaming data sources (e.g., writers, clients, etc.), data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

In one or more embodiments, the system (100) may be a distributed system (e.g., a data processing environment for processing streaming application data) and may deliver at least computing power (e.g., real-time (on the order of milliseconds (ms) or less) network monitoring, server virtualization, etc.), storage capacity (e.g., data backup), and data protection (e.g., software-defined data protection, disaster recovery, etc.) as a service to users of clients (e.g., 110A, 110N, etc.). For example, the system (100) may be configured to organize unbounded, continuously generated data into a data stream (described below in reference to FIG. 1.2) that may be auto-scaled based on individual segment loading. The system (100) may also represent a comprehensive middleware layer executing on computing devices (e.g., 300, FIG. 3) that supports application and storage environments.

In one or more embodiments, the system (100) may support one or more virtual machine (VM) environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

To provide computer-implemented services to the users, the system (100) may perform some computations (e.g., data collection, distributed processing of collected data, etc.) locally (e.g., at the users' site using the clients (e.g., 110A, 110N, etc.)) and other computations remotely (e.g., away from the users' site using the IN (120)) from the users. By doing so, the users may utilize different computing devices (e.g., 300, FIG. 3) that have different quantities of computing resources (e.g., processing cycles, memory, storage, etc.) while still being afforded a consistent user experience. For example, by performing some computations remotely, the system (100) (i) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc. Further, as used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user/customer of a client (described below). The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, a client (e.g., 110A, 110N, etc.) may include functionality to, e.g.: (i) capture sensory input (e.g., sensor data) in the form of text, audio, video, touch or motion, (ii) collect massive amounts of data at the edge of an IoT network (where, the collected data may be grouped as: (a) data that needs no further action and does not need to be stored, (b) data that should be retained for later analysis and/or record keeping, and (c) data that requires an immediate action/response), (iii) provide to other entities (e.g., the IN (120)), store, or otherwise utilize captured sensor data (and/or any other type and/or quantity of data), and (iv) provide surveillance services (e.g., determining object-level information, performing face recognition, etc.) for scenes (e.g., a physical region of space). One of ordinary skill will appreciate that the client may perform other functionalities without departing from the scope of the embodiments disclosed herein.

In one or more embodiments, the clients (e.g., 110A, 110N, etc.) may be geographically distributed devices (e.g., user devices, front-end devices, etc.) and may have relatively restricted hardware and/or software resources when compared to the IN (120). As being, for example, a sensing device, each of the clients may be adapted to provide monitoring services. For example, a client may monitor the state of a scene (e.g., objects disposed in a scene). The monitoring may be performed by obtaining sensor data from sensors that are adapted to obtain information regarding the scene, in which a client may include and/or be operatively coupled to one or more sensors (e.g., a physical device adapted to obtain information regarding one or more scenes).

In one or more embodiments, the sensor data may be any quantity and types of measurements (e.g., of a scene's properties, of an environment's properties, etc.) over any period(s) of time and/or at any points-in-time (e.g., any type of information obtained from one or more sensors, in which different portions of the sensor data may be associated with different periods of time (when the corresponding portions of sensor data were obtained)). The sensor data may be obtained using one or more sensors. The sensor may be, for example (but not limited to): a visual sensor (e.g., a camera adapted to obtain optical information (e.g., a pattern of light scattered off of the scene) regarding a scene), an audio sensor (e.g., a microphone adapted to obtain auditory information (e.g., a pattern of sound from the scene) regarding a scene), an electromagnetic radiation sensor (e.g., an infrared sensor), a chemical detection sensor, a temperature sensor, a humidity sensor, a count sensor, a distance sensor, a global positioning system sensor, a biological sensor, a differential pressure sensor, a corrosion sensor, etc.

In one or more embodiments, the clients (e.g., 110A, 110N, etc.) may be physical or logical computing devices configured for hosting one or more workloads, or for providing a computing environment whereon workloads may be implemented. The clients may provide computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more service level agreements (SLAs) configured by users of the clients). The clients (e.g., 110A, 110N, etc.) may correspond to computing devices that one or more users use to interact with one or more components of the system (100).

In one or more embodiments, a client (e.g., 110A, 110N, etc.) may include any number of applications (and/or content accessible through the applications) that provide computer-implemented services to a user. Applications may be designed and configured to perform one or more functions instantiated by a user of the client. In order to provide application services, each application may host similar or different components. The components may be, for example (but not limited to): instances of databases, instances of email servers, etc. Applications may be executed on one or more clients as instances of the application.

Applications may vary in different embodiments, but in certain embodiments, applications may be custom developed or commercial (e.g., off-the-shelf) applications that a user desires to execute in a client (e.g., 110A, 110N, etc.). In one or more embodiments, applications may be logical entities executed using computing resources of a client. For example, applications may be implemented as computer instructions stored on persistent storage of the client that when executed by the processor(s) of the client, cause the client to provide the functionality of the applications described throughout the application.

In one or more embodiments, while performing, for example, one or more operations requested by a user, applications installed on a client (e.g., 110A, 110N, etc.) may include functionality to request and use physical and logical resources of the client. Applications may also include functionality to use data stored in storage/memory resources of the client. The applications may perform other types of functionalities not listed above without departing from the scope of the embodiments disclosed herein. While providing application services to a user, applications may store data that may be relevant to the user in storage/memory resources of the client.

In one or more embodiments, to provide services to the users, the clients (e.g., 110A, 110N, etc.) may utilize, rely on, or otherwise cooperate with the IN (120). For example, the clients may issue requests to the IN to receive responses and interact with various components of the IN. The clients may also request data from and/or send data to the IN (for example, the clients may transmit information to the IN that allows the IN to perform computations, the results of which are used by the clients to provide services to the users). As yet another example, the clients may utilize computer-implemented services provided by the IN (120). When the clients interact with the IN, data that is relevant to the clients may be stored (temporarily or permanently) in the IN.

In one or more embodiments, a client (e.g., 110A, 110N, etc.) may be capable of, e.g.: (i) collecting users' inputs, (ii) correlating collected users' inputs to the computer-implemented services to be provided to the users, (iii) communicating with the IN (120) that perform computations necessary to provide the computer-implemented services, (iv) using the computations performed by the IN to provide the computer-implemented services in a manner that appears (to the users) to be performed locally to the users, and/or (v) communicating with any virtual desktop (VD) in a virtual desktop infrastructure (VDI) environment (or a virtualized architecture) provided by the IN (using any known protocol in the art), for example, to exchange remote desktop traffic or any other regular protocol traffic (so that, once authenticated, users may remotely access independent VDs).

As described above, the clients (e.g., 110A, 110N, etc.) may provide computer-implemented services to users (and/or other computing devices). The clients may provide any number and any type of computer-implemented services. To provide computer-implemented services, each client may include a collection of physical components (e.g., processing resources, storage/memory resources, networking resources, etc.) configured to perform operations of the client and/or otherwise execute a collection of logical components (e.g., virtualization resources) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a central processing unit (CPU), a graphics processing unit (GPU), a data processing unit (DPU), a computation acceleration resource, an application-specific integrated circuit (ASIC), a digital signal processor for facilitating high speed communication, etc.

In one or more embodiments, a storage or memory resource (not shown) may refer to a measurable quantity of a storage/memory-relevant resource type, which can be requested, allocated, and consumed (for example, to store sensor data and provide previously stored data). A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, while the clients (e.g., 110A, 110N, etc.) provide computer-implemented services to users, the clients may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (e.g., 110A, 110N, etc.) may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the embodiments disclosed herein.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card (NIC), a network adapter, a network processor, etc.

In one or more embodiments, a networking resource may provide capabilities to interface a client with external entities (e.g., the IN (120)) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transport control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other clients (e.g., 110A, 110N, etc.). For example, when utilizing remote direct memory access (RDMA) to access data on another client, it may not be necessary to interact with the logical components of that client. Rather, when using RDMA, it may be possible for the networking resource to interact with the physical components of that client to retrieve and/or transmit data, thereby avoiding any higher-level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU (vCPU), a virtual storage pool, etc.

In one or more embodiments, a virtualization resource may include a hypervisor (e.g., a VM monitor), in which the hypervisor may be configured to orchestrate an operation of, for example, a VM by allocating computing resources of a client (e.g., 110A, 110N, etc.) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor. Alternatively, in one or more of embodiments, the hypervisor may be implemented as computer instructions stored on storage/memory resources of the client that when executed by processing resources of the client, cause the client to provide the functionality of the hypervisor.

In one or more embodiments, a client (e.g., 110A, 110N, etc.) may be, for example (but not limited to): a physical computing device, a smartphone, a tablet, a wearable, a gadget, a closed-circuit television (CCTV) camera, a music player, a game controller, etc. Different clients may have different computational capabilities. In one or more embodiments, Client A (110A) may have 16 gigabytes (GB) of dynamic RAM (DRAM) and 1 CPU with 12 cores, whereas Client N (110N) may have 8 GB of PMEM and 1 CPU with 16 cores. Other different computational capabilities of the clients not listed above may also be taken into account without departing from the scope of the embodiments disclosed herein.

Further, in one or more embodiments, a client (e.g., 110A, 110N, etc.) may be implemented as a computing device (e.g., 300, FIG. 3). The computing device may be, for example, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the client described throughout the application.

Alternatively, in one or more embodiments, the client (e.g., 110A, 110N, etc.) may be implemented as a logical device (e.g., a VM). The logical device may utilize the computing resources of any number of computing devices to provide the functionality of the client described throughout this application.

In one or more embodiments, users (e.g., customers, administrators, people, etc.) may interact with (or operate) the clients (e.g., 110A, 110N, etc.) in order to perform work-related tasks (e.g., production workloads). In one or more embodiments, the accessibility of users to the clients may depend on a regulation set by an administrator of the clients. To this end, each user may have a personalized user account that may, for example, grant access to certain data, applications, and computing resources of the clients. This may be realized by implementing the virtualization technology. In one or more embodiments, an administrator may be a user with permission (e.g., a user that has root-level access) to make changes on the clients that will affect other users of the clients.

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in hardware (e.g., circuitry), software, or any combination thereof.

In one or more embodiments, a GUI may be displayed on a display of a computing device (e.g., 300, FIG. 3) using functionalities of a display engine (not shown), in which the display engine is operatively connected to the computing device. The display engine may be implemented using hardware (or a hardware component), software (or a software component), or any combination thereof. The login screen may be displayed in any visual format that would allow the user to easily comprehend (e.g., read and parse) the listed information.

In one or more embodiments, the IN (120) may include (i) a chassis (e.g., a mechanical structure, a rack mountable enclosure, etc.) configured to house one or more servers (or blades) and their components and (ii) any instrumentality or aggregate of instrumentalities operable to compute, classify, process, transmit, receive, retrieve, originate, switch, store, display, manifest, detect, record, reproduce, handle, and/or utilize any form of data for business, management, entertainment, or other purposes.

In one or more embodiments, the IN (120) may include functionality to, e.g.: (i) obtain (or receive) data (e.g., any type and/or quantity of input) from any source (and, if necessary, aggregate the data); (ii) perform complex analytics and analyze data that is received from one or more clients (e.g., 110A, 110N, etc.) to generate additional data that is derived from the obtained data without experiencing any middleware and hardware limitations; (iii) provide meaningful information (e.g., a response) back to the corresponding clients; (iv) filter data (e.g., received from a client) before pushing the data (and/or the derived data) to the long-term storage (140) for management of the data and/or for storage of the data (while pushing the data, the IN may include information regarding a source of the data (e.g., an identifier of the source) so that such information may be used to associate provided data with one or more of the users (or data owners)); (v) host and maintain various workloads; (vi) provide a computing environment whereon workloads may be implemented (e.g., employing linear, non-linear, and/or machine learning (ML) models to perform cloud-based data processing); (vii) incorporate strategies (e.g., strategies to provide VDI capabilities) for remotely enhancing capabilities of the clients; (viii) provide robust security features to the clients and make sure that a minimum level of service is always provided to a user of a client; (ix) transmit the result(s) of the computing work performed (e.g., real-time business insights, equipment maintenance predictions, other actionable responses, etc.) to another IN (not shown) for review and/or other human interactions; (x) exchange data with other devices registered in/to the network (130) in order to, for example, participate in a collaborative workload placement (e.g., the node may split up a request (e.g., an operation, a task, an activity, etc.) with another IN, coordinating its efforts to complete the request more efficiently than if the IN had been responsible for completing the request); (xi) provide software-defined data protection for the clients (e.g., 110A, 110N, etc.); (xii) provide automated data discovery, protection, management, and recovery operations for the clients; (xiii) monitor operational states of the clients; (xiv) regularly back up configuration information of the clients to the long-term storage (140); (xv) provide (e.g., via a broadcast, multicast, or unicast mechanism) information (e.g., a location identifier, the amount of available resources, etc.) associated with the IN to other INs of the system (100); (xvi) configure or control any mechanism that defines when, how, and what data to provide to the clients and/or long-term storage; (xvii) provide data deduplication; (xviii) orchestrate data protection through one or more GUIs; (xix) empower data owners (e.g., users of the clients) to perform self-service data backup and restore operations from their native applications; (xx) ensure compliance and satisfy different types of service level objectives (SLOs) set by an administrator/user; (xxi) increase resiliency of an organization by enabling rapid recovery or cloud disaster recovery from cyber incidents; (xxii) provide operational simplicity, agility, and flexibility for physical, virtual, and cloud-native environments; (xxiii) consolidate multiple data process or protection requests (received from, for example, clients) so that duplicative operations (which may not be useful for restoration purposes) are not generated; (xxiv) initiate multiple data process or protection operations in parallel (e.g., an IN may host multiple operations, in which each of the multiple operations may (a) manage the initiation of a respective operation and (b) operate concurrently to initiate multiple operations); and/or (xxv) manage operations of one or more clients (e.g., receiving information from the clients regarding changes in the operation of the clients) to improve their operations (e.g., improve the quality of data being generated, decrease the computing resources cost of generating data, etc.). In one or more embodiments, in order to read, write, or store data, the IN (120) may communicate with, for example, the long-term storage (140) and/or other storage devices in the system (100).

As described above, the IN (120) may be capable of providing a range of functionalities/services to the users of the clients (e.g., 110A, 110N, etc.). However, not all of the users may be allowed to receive all of the services. To manage the services provided to the users of the clients, a system (e.g., a service manager) in accordance with embodiments disclosed herein may manage the operation of a network (e.g., 130), in which the clients are operably connected to the IN. Specifically, the service manager (i) may identify services to be provided by the IN (for example, based on the number of users using the clients) and (ii) may limit communications of the clients to receive IN provided services.

For example, the priority (e.g., the user access level) of a user may be used to determine how to manage computing resources of the IN (120) to provide services to that user. As yet another example, the priority of a user may be used to identify the services that need to be provided to that user. As yet another example, the priority of a user may be used to determine how quickly communications (for the purposes of providing services in cooperation with the internal network (and its subcomponents)) are to be processed by the internal network.

Further, consider a scenario where a first user is to be treated as a normal user (e.g., a non-privileged user, a user with a user access level/tier of 4/10). In such a scenario, the user level of that user may indicate that certain ports (of the subcomponents of the network (130) corresponding to communication protocols such as the TCP, the UDP, etc.) are to be opened, other ports are to be blocked/disabled so that (i) certain services are to be provided to the user by the IN (120) (e.g., while the computing resources of the IN may be capable of providing/performing any number of remote computer-implemented services, they may be limited in providing some of the services over the network (130)) and (ii) network traffic from that user is to be afforded a normal level of quality (e.g., a normal processing rate with a limited communication bandwidth (BW)). By doing so, (i) computer-implemented services provided to the users of the clients (e.g., 110A, 110N, etc.) may be granularly configured without modifying the operation(s) of the clients and (ii) the overhead for managing the services of the clients may be reduced by not requiring modification of the operation(s) of the clients directly.

In contrast, a second user may be determined to be a high priority user (e.g., a privileged user, a user with a user access level of 9/10). In such a case, the user level of that user may indicate that more ports are to be opened than were for the first user so that (i) the IN (120) may provide more services to the second user and (ii) network traffic from that user is to be afforded a high-level of quality (e.g., a higher processing rate than the traffic from the normal user).

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, operating system (OS) data, etc.), medium workloads with higher priority (e.g., VM with FS data, network data management protocol (NDMP) data, etc.), large workloads with critical priority (e.g., mission critical application data), etc.

Further, while a single IN (e.g., 120) is considered above, the term "node" includes any collection of systems or sub-systems that individually or jointly execute a set, or multiple sets, of instructions to provide one or more computer-implemented services. For example, a single IN may provide a computer-implemented service on its own (i.e., independently) while multiple other nodes may provide a second computer-implemented service cooperatively (e.g., each of the multiple other nodes may provide similar and or different services that form the cooperatively provided service).

As described above, the IN (120) may provide any quantity and any type of computer-implemented services. To provide computer-implemented services, the IN may be a heterogeneous set, including a collection of physical components/resources (discussed above) configured to perform operations of the node and/or otherwise execute a collection of logical components/resources (discussed above) of the node.

In one or more embodiments, the IN (120) may implement a management model to manage the aforementioned computing resources in a particular manner. The management model may give rise to additional functionalities for the computing resources. For example, the management model may automatically store multiple copies of data in multiple locations when a single write of the data is received. By doing so, a loss of a single copy of the data may not result in a complete loss of the data. Other management models may include, for example, adding additional information to stored data to improve its ability to be recovered, methods of communicating with other devices to improve the likelihood of receiving the communications, etc. Any type and number of management models may be implemented to provide additional functionalities using the computing resources without departing from the scope of the embodiments disclosed herein.

One of ordinary skill will appreciate that the IN (120) may perform other functionalities without departing from the scope of the embodiments disclosed herein. In one or more embodiments, the IN may be configured to perform (in conjunction with the streaming storage system (125)) all, or a portion, of the functionalities described in FIGS. 2.1-2.3.

In one or more embodiments, the IN (120) may be implemented as a computing device (e.g., 300, FIG. 3). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the IN described throughout the application.

Alternatively, in one or more embodiments, similar to a client (e.g., 110A, 110N, etc.), the IN (120) may also be implemented as a logical device.

In the embodiments of the present disclosure, the streaming storage system (125) is demonstrated as a separate entity from the IN (120); however, embodiments disclosed herein are not limited as such. The streaming storage system (125) may be demonstrated as a part of the IN (e.g., as deployed to the IN). Additional details of the streaming storage system are described below in reference to FIG. 1.2.

In the embodiments of the present disclosure, the long-term storage (140) is demonstrated as a separate entity from the IN (120); however, embodiments disclosed herein are not limited as such. The long-term storage (140) may be demonstrated as a part of the IN (e.g., as deployed to the IN). Additional details of the long-term storage are described below in reference to FIG. 1.2.

In one or more embodiments, all, or a portion, of the components of the system (100) may be operably connected each other and/or other entities via any combination of wired and/or wireless connections. For example, the aforementioned components may be operably connected, at least in part, via the network (130). Further, all, or a portion, of the components of the system (100) may interact with one another using any combination of wired and/or wireless communication protocols.

In one or more embodiments, the network (130) may represent a (decentralized or distributed) computing network and/or fabric configured for computing resource and/or messages exchange among registered computing devices (e.g., the clients, the IN (120), the long-term storage (140), the streaming storage system (125), etc.). As discussed above, components of the system (100) may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network (130) may be implemented using any combination of wired and/or wireless network topologies, and the network may be operably connected to the Internet or other networks. Further, the network (130) may enable interactions between, for example, the clients and the IN through any number and type of wired and/or wireless network protocols (e.g., TCP, UDP, IPv4, etc.).

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (130) and its subcomponents may be implemented using hardware, software, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly.

In one or more embodiments, the network-enabled subcomponents may decide how real-time (e.g., on the order of ms or less) network traffic and non-real-time network traffic should be managed in the network (130). In one or more embodiments, the real-time network traffic may be high-priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VOIP), etc.

Turning now to FIG. 1.2, FIG. 1.2 shows a diagram/architecture of the streaming storage system (125) in accordance with one or more embodiments disclosed herein. The streaming storage system (125) (e.g., Dell Pravega or simply "Pravega") includes a controller (162), a logger (166) (e.g., a bookkeeper service), a segment store (SS) (164), and a consensus service (168) (e.g., a zookeeper service). The streaming storage system (125) may include additional, fewer, and/or different components without departing from the scope of the embodiments disclosed herein. For example, based on the amount of available computing resources in the IN (e.g., 120, FIG. 1.1), the streaming storage system (125) may host multiple controllers, segment containers (SCs) (e.g., 165A, 165B, etc.), and/or SSs executing contemporaneously, e.g., distributed across multiple servers, VMs, or containers, for scalability and fault tolerance. Each component may be operably connected to any of the other component via any combination of wired and/or wireless connections. Each component illustrated in FIG. 1.2 is discussed below.

The embodiment shown in FIG. 1.2 may show a scenario in which (i) one or more SCs (e.g., 165A, 165B, etc.) are distributed across the SS (164) and (ii) the streaming storage system (125) is an independent system (e.g., meaning that the streaming storage system may customize the resource usage of the SS independently, in an isolated manner).

In one or more embodiments, the streaming storage system (125) allows users (via clients (e.g., Client A (110A))) to ingest data and execute real-time analytics/processing on that data (while guaranteeing data consistency and durability (e.g., once acknowledged, data is never lost)). With the help of the SS (164), the data may be progressively moved to the long-term storage (140) so that users may have access to the data to perform large-scale batch analytics, for example, on a cloud (with more resources). Users may define clusters that execute a subset of assigned SCs across the system (e.g., 100, FIG. 1.1) so that different subsets of SCs may be executed on independent clusters (which may be customized in terms of instances and resources per-instance) to adapt different kinds of workloads and hardware components.

In one or more embodiments, the controller (162) may represent a "control plane" and the SS (164) may represent a "data plane". The SS (164) may execute/host, at least, SC A (165A) and SC (165B) (as "active" SCs, so they may serve write/read operations), in which an SC is a unit of parallelism in Pravega (or a unit of work of a SS) and is responsible for executing any storage or metadata operations against the segments (described below) allocated in it. Due to the design characteristics of Pravega (e.g., with the help of the integrated storage tiering mechanism of Pravega), the SS (164) may store data to the long-term storage (140), in which the tiering storage may be useful to provide instant access to recent stream data. Although not shown, the streaming storage system may include one or more processors, buses, and/or other components without departing form the scope of the embodiments disclosed herein.

In one or more embodiments, an SC may represent how Pravega partitions a workload (e.g., a logical partition of the workload at the data plane) in order to host segments of streams. Once (automatically) initialized/initiated, an SC may keep executing on its corresponding SS (e.g., a physical component) to perform one or more operations, where, for example, Client A (110A) may not be aware of what the location of an SC in Pravega (e.g., in case Client A wants to generate a new stream with a segment).

In one or more embodiments, the control plane may include functionality to, e.g.: (i) in conjunction with the data plane, generate, alter, and/or delete streams; (ii) retrieve information about streams; and/or (iii) monitor health of a Pravega cluster (described below) by gathering metrics. Further, the SS (164) may provide an application programming interface (API) to read/write data in streams.

In one or more embodiments, a stream (described below) may be partitioned/decomposed into stream segments (or simply "segments"). A stream may have one or more segments (where each segment may be stored in a combination of tier-1 storage and tier-2 storage), in which data/event written into the stream may be written into exactly one of the segments based on the event's routing key (e.g., "writer.writeEvent (routingkey, message)"). In one or more embodiments, writers (e.g., of Client A (110A)) may use routing keys (e.g., user identifier, timestamp, machine identifier, etc., to determine a target segment for a stream write operation) so that data is grouped together.

In one or more embodiments, based on the inherent capabilities of the streaming storage system (125) (e.g., Pravega), data streams may have multiple open segments in parallel (e.g., enabling the data stream parallelism), both for ingesting and consuming data. The number of parallel stream segments in a stream may automatically grow and shrink over time based on the input/output (I/O) load the stream receives, so that the parallelism of the stream may be modified based on the number of serverless functions to be executed, if needed.

As described above, a data stream with one or more segments may support parallelism of data writes, in which multiple writers (or multiple writer components) writing data to different segments may exploit/involve one or more servers hosted in a Pravega cluster (e.g., one or more servers, the controller (162), and the SS (164) may collectively be referred to as a "Pravega cluster", in which the Pravega cluster may be coordinated to execute Pravega). In one or more embodiments, a consistent hashing scheme may be used to assign incoming events to their associated segments (such that each event is mapped to only one of the segments based on "user-provided" or "event" routing key), in which event routing keys may be hashed to form "key space" and the key space may be divided into a number of partitions, corresponding to the number of segments. Additionally, each segment may be associated with only one instance of SS (e.g., the SS (164)).

In one or more embodiments, from the perspective of a reader (or a reader component) (e.g., Client A (110A) may include a writer component and a reader component), the number of segments may represent the maximum degree of read parallelism possible (e.g., all the events from a set of streams will be read by only one reader in a "reader group (RG)". If a stream has N segments, then an RG with N reader components may consume from the stream in parallel (e.g., for any RG reading a stream, each segment may be assigned to one reader component in that RG). In one or more embodiments, increasing the number of segments may increase the number of readers in an RG to increase the scale of processing the data from that stream, whereas, as the number of segments decreases, the number of readers may be reduced.

In one or more embodiments, a reader may be an application that reads events from a stream either at the tail of the stream or at any part of the stream's historical data. Unlike log-based systems that use the same kind of storage for tail reads/writes as well as reads to historical data, a tail of a stream may be kept in tier-1 storage, where write operations may be implemented by the logger (166) as described herein. In some cases (e.g., when a failure has occurred and the system is being recovered), the logger may serve read operations.

In one or more embodiments, tail reads may mean that recently written events are immediately delivered to one or more readers, in which, depending on the nature of a job defined by an administrator (e.g., start analyzing the stream data from the beginning), some readers may read from earlier parts of the stream (which is called "catch-up" reads). As described above, readers may be organized into RGs, in which readers that form an RG may (together) perform parallel reads from a given stream. When a newer reader is generated through the data plane's API, the administrator may include the name of the RG associated with the reader. Further, Pravega guarantees that each event published to a relevant stream is sent to exactly one reader within the RG.

In one or more embodiments, an RG may include one or more readers, and there may be may different RGs simultaneously reading from any given stream. Further, an RG may be considered as a "composite reader" or a "distributed reader", in which being a distributed reader allows a distributed application to read and process stream data in parallel. In one or more embodiments, a coordinated group of readers may consume/read a large amount of stream data in an RG. For example, a collection of Apache Flink tasks may process stream data in parallel using a relevant RG.

In one or more embodiments, the streaming storage system (125) (e.g., Pravega) may implement exactly-once semantics (or "exactly once delivery semantics"), which means data is delivered and processed exactly-once (with exact ordering guarantees), despite failures in, for example, Client A (110A), servers, serverless functions (e.g., mappers, reducers, etc.), and/or the network. To achieve exactly-once semantics, streams may be durable, ordered, consistent, and/or transactional (e.g., embodiments disclosed herein may enable durable storage of streaming data with strong consistency, ordering guarantees, and high-performance).

As used herein, "ordering" may mean that data is read by reader components in the order it is written. In one or more embodiments, data may be written along with an application-defined routing key, in which the ordering guarantee may be made in terms of routing keys (e.g., a write order may be preserved by a routing key, which may facilitate write parallelism). For example, two pieces of data with the same routing key may be read by a reader in the order they were written. In one or more embodiments, Pravega (more specifically, the SS (164)) may enable an ordering guarantee to allow data reads to be replayed (e.g., when applications fail) and the results of replaying the reads (or the read processes) may be the same.

As used herein, "consistency" may mean that reader components read the same ordered view of data for a given routing key, even in the case of a failure (without missing any data/event). In one or more embodiments, Pravega (more specifically, the SS (164)) may perform idempotent write processes, where rewrites performed as a result of failure recovery may not result in data duplication (e.g., a write process may be performed without suffering from the possibility of data duplication (and storage overhead) on reconnections).

In one or more embodiments, the SS (164) may automatically (e.g., elastically and independently) scale individual data streams to accommodate changes in a data ingestion rate. The SS may enable shrinking of write latency to ms, and may seamlessly handle high-throughput reads/writes from Client A (110A), making the SS ideal for IoT and other time-sensitive implementations. For example, consider a scenario where an IoT application receives information from hundreds of devices feeding thousands of data streams. In this scenario, the IoT application processes those streams to derive a business value from all that raw data (e.g., predicting device failures, optimizing service delivery through those devices, tailoring a user's experience when interacting with those devices, etc.). As indicated, building such an application at scale is difficult without having the components be able to scale automatically as the rate of data increases and decreases.

In one or more embodiments, a data stream (or stream data) may be configured to grow the number of segments as more data is written to the stream, and to shrink when data volume drops off. In one or more embodiments, growing and shrinking a stream may be performed based on a stream's SLO (e.g., to match the behavior of data input). For example, the SS (164) may enable monitoring a rate of data ingest/input to a stream and use the SLO to add or remove segments from the stream. In one or more embodiments, (i) segments may be added by splitting a segment/shard/partition of a stream (e.g., scaling may cause an existing segment, stored at the related data storage thus far, to be split into plural segments; scaling may cause an existing event, stored at the corresponding data storage thus far, to be split into plural events; etc.), (ii) segments may be removed by merging two segments (e.g., scaling may cause multiple existing segments to be merged into a new segment; scaling may cause multiple existing events to be merged into a new event; etc.), and/or (iii) the number of segments may vary over time (e.g., to deal with a potentially large amount of information in a stream). Further, a configuration of a writer component may not change when segments are split or merged, and a reader component may be notified via a stream protocol when segments are split or merged to enable reader parallelism.

In one or more embodiments, Client A (110A) may send metadata requests to the controller (162) and may send data requests (e.g., write requests, read requests, create a stream, delete the stream, get the segments, etc.) to the SS (164). With respect to a "write path" (which is primarily driven by a sequential write performance of the logger (166)), the writer component of Client A (110A) may first communicate with the controller (162) to perform a write operation (e.g., appending events/data) and to infer which SS it supposed to connect to. Based on that, the writer component may connect to the SS (164) to start appending data. Thereafter, the SS (164) (more specifically, SCs hosted by the SS) may first write data (synchronously) to the logger (166) (e.g., the "tier-1 storage" of Pravega (which typically executes within the Pravega cluster), Apache Bookkeeper, a distributed write ahead log, etc.) to achieve data durability (e.g., in the presence of small write operations) and low-latency (e.g., <10 ms) before acknowledging the writer component on every data written (so that data may not be lost as data is saved in protected, persistent/temporary storage before the write operation is acknowledged).

Once acknowledged, in an offline process, the SS (164) may group the data (written to the logger (166) into larger chunks and asynchronously move the larger chunks to the long-term storage (140) (e.g., the "tier-2 storage" of Pravega, pluggable storage, AWS S3, Apache HDFS, Dell Isilon, Dell ECS, object storage, block storage, file system storage, etc.) for high read/write throughput (e.g., to perform batch analytics) (as indicated, Client A (110A) may not directly write to tier-2 storage) and for permanent data storage. For example, Client A may send a data request for storing and processing video data from a surgery in real-time (e.g., performing computations (or real-time analytics) on the video data captured by surgery cameras for providing augmented reality capabilities on the video data to help surgeons, where SC A (165A) may be used for this purpose), and eventually, this data may need to be available (or permanently stored) on a larger information technology (IT) facility that hosts enough storage/memory and compute resources (e.g., for executing batch analytics on historical video data to train ML models, where the video data may be asynchronously available in the tier-2 storage).

Further, with respect to a "read path" (which is isolated from the write path), the reader component of Client A (110A) may first communicate with the controller (162) to perform a read operation and to infer which SS it supposed to connect to (e.g., via its memory cache, the SS (164) may indicate where it keeps the data such that the SS may serve tail of data from the cache). For example, if the data is not cached (e.g., historical data), the SS may pull data from the long-term storage (140) so that the reader component performs the read operation (as indicated, the SS may not use the logger (166) to serve a read request of the reader component, where the data in the logger may be used for recovery purposes when necessary).

In one or more embodiments, once data is (and/or will be) provided by Client A (110A) to the SS (164), users may desire access to the data managed by the SS. To facilitate provisioning of access to the data, the SS may manage one or more data structures (in conjunction with the logger (166)), such as block chains, that include information, e.g.: (i) related to data ownership, (ii) related to the data that is managed, (iii) related to users (e.g., data owners), and/or (iv) related to how users may access the stored data. In one or more embodiments, by providing data management services and/or operational management services (in conjunction with the logger) to the users and/or other entities, the SS may enable any number of entities to access data. As part of providing the data management services, the SS may provide (in conjunction with the logger and/or the long-term storage (140)) a secure method for storing and accessing data. By doing so, access to data in the logger may be provided securely while facilitating provisioning of access to the data.

The data management services and/or operational management services provided by the SS (164) (through, for example, its SCs) may include, e.g.: (i) obtaining data requests and/or data from Client A (110A) (where, for example, Client A performs a data write operation through a communication channel); (ii) organizing and/or writing/storing the "obtained" data (and metadata regarding the data) to the logger (166) to durably store the data; (iii) generating derived data based on the obtained data (e.g., grouping the data into larger chunks by employing a set of linear, non-linear, and/or ML models), (iv) providing/moving the obtained data, derived data, and/or metadata associated with both data to the long-term storage (140); (v) managing when, how, and/or what data Client A may provide; (vi) temporarily storing the obtained data in its cache for serving that data to reader components; and/or (vii) queueing one or more data requests.

In one or more embodiments, as being part of the tiered storage streaming system (e.g., tier-1 (durable) storage), the logger (166) may provide short-term, low-latency data storage/protection while preserving/guaranteeing the durability and consistency of data written to streams. In some embodiments, the logger may exist/execute within the Pravega cluster. As discussed above, the SS (164) may enable low-latency, fast, and durable write operations (e.g., data is replicated and persisted to disk before being acknowledged) to return an acknowledgement to a writer component (e.g., of Client A (110A)), and these operations may be optimized (in terms of I/O throughput) with the help of the logger.

In one or more embodiments, to add further efficiency, write operations to the logger (166) may involve data from multiple segments, so the cost of persisting data to disk may be amortized over several write operations. The logger may persist the most recently written stream data (to make sure reading from the tail of a stream can be performed as fast as possible), and as data in the logger ages, the data may be moved to the long-term storage (140) (e.g., a tail of a segment may be stored in tier-1 storage providing low-latency reads/writes, whereas the rest of the segment may be stored in tier-2 storage providing high-throughput read access with near-infinite scale and low-cost). Further, the Pravega cluster may use the logger as a coordination mechanism for its components, where the logger may rely on the consensus service (168).

One of ordinary skill will appreciate that the logger (166) may perform other functionalities without departing from the scope of the embodiments disclosed herein. The logger (166) may be implemented using hardware (e.g., any number of integrated circuits for processing computer readable instructions), software, or any combination thereof.

In one or more embodiments, in case of reads, SC A (165A) may have a "read index" that tracks the data read for the related segments, as well what fraction of that data is stored in cache. If a read process (e.g., initiated upon receiving a read request) requests data for a segment that is not cached, the read index may trigger a read process against the long-term storage (140) to retrieve that data, storing it in the cache, in order to serve Client A (110A).

As used herein, data may refer to a "stream data (or a "stream")" that is a continuous (or continuously generated), unbounded (in size), append-only (e.g., data in a stream cannot be modified but may be truncated, meaning that segments are indivisible units that form the stream), lightweight (e.g., as a file), and durable sequence of bytes (e.g., a continuous data flow/structure that may include data, metadata, and/or the like; a collection of data records called "events", in which there may not be a limit on how many events can be in a stream or how many total bytes are stored in a stream; etc.) generated (in parallel) by one or more data sources (e.g., 110A, 110N, IoT sensors, etc.). In one or more embodiments, by using append-only log data structures (which are useful for serverless computing frameworks while supporting real-time and historical data access), the SS (164) may enable rapid ingestion of information into durable storage (e.g., the logger (166)) and support a large variety of application use cases (e.g., publish/subscribe messaging, NoSQL databases, event-oriented applications, etc.). Further, a writer component may keep inserting events at one end of a stream and a reader component may keep reading the latest ones from there or for historical reads, the reader component may target specific offsets and keep reading from there.

As used herein, serverless computing frameworks may refer to Function-as-a-Service (FaaS) platforms, which allow users to focus only on their code and implementation of the code at a large scale without having to worry about the infrastructure and/or resource management. In most cases, FaaS platforms provide reactive approaches to execute functions (i.e., based events) and to enable stateless computations (e.g., when the execution halts, the "serverless" function may not keep anything in memory unless the function wrote the related data to object storage). Due to their stateless and short-lived nature, serverless functions may need to transfer the results of their computations to other functions via an intermediate system.

While for small computations there may be multiple options (e.g., messaging systems, queues, etc.), for data-intensive FaaS pipelines that manage larger amounts of data (e.g., video files, audio files, images, large text files, etc.), the conventional approach is to store intermediate results as objects in object storage. However, the problem with the conventional approach is that there is a mismatch between the design of the pipeline and the storage layer used by it. The pipeline of data-intensive functions may exploit the fact of using data streams as a substrate for improving latency and processing results byte-by-byte. However, using object storage may force a computation step/stage to be completed and store its results as objects (in object storage) for the next step of functions to be triggered. This may induce additional latency that impact on the overall performance of the pipeline. In the case of a failure, using the object storage (as a storage layer for intermediate function results) may provide no mechanism for guaranteeing exactly-once semantics in the pipeline. This data, if there is a failure in the execution of the pipeline, may be processed twice or some data may be missed to generate the result, and one or more embodiments disclosed herein advantageously overcome these issues.

Continuing with the discussion of FIG. 1.2, an event may be a collection of bytes within a stream (or a contiguous set of related extents of unbounded, continuously generated data) (e.g., a small number of bytes including a temperature reading from an IoT sensor composed of a timestamp, a metric identifier, and a value; web data associated with a user click on a website; a timestamped readout from one sensor of a sensor array; etc.). Said another way, events (which are atomic) may be appended to segments of a data stream (e.g., a stream of bytes), where segments are the unit of storage of the data stream (e.g., a data stream may be comprised of one or more segments, where (i) each segment may include one or more events (where a segment may not store events directly, the segment may store the append-only sequence of bytes of the events) and (ii) events may be appended to segments by serializing them into bytes, where once written, that sequence of bytes is immutable). In one or more embodiments, events may be stored along a data stream in parallel to one another and/or in succession to one another (where segments may provide parallelism). That is, one or more events may have data occurring in parallel, or having occurred in parallel. Further, one or more events may sequentially follow one or more other events, such as having data that occurs after one or more other events, or has occurred after data from one or more other events.

In one or more embodiments, the number of segments for appending and/or truncating (e.g., the oldest data from a stream without compromising with the data format) may vary over a respective unit axis of a data stream. It will be appreciated that a data stream may be represented relative to a time axis. That is, data and/or events may be written to and/or appended to a stream continuously, such as in a sequence or in an order. Likewise, such data may be reviewed and/or analyzed by a user in a sequence or in an order (e.g., a data stream may be arranged based upon a predecessor-successor order along the data stream).

Sources of data written, posted, and/or otherwise appended to a stream may include, for example (but not limited to): online shopping applications, social network applications (e.g., producing a stream of user events such as status updates, online transactions, etc.), IoT sensors, video surveillance cameras, drone images, autonomous vehicles, servers (e.g., producing a stream of telemetry information such as CPU utilization, memory utilization, etc.) etc. The data from streams (and thus from the various events appended to the streams) may be consumed, by ingesting, reading, analyzing, and/or otherwise employing in various ways (e.g., by reacting to recent events to analyze historical stream data).

In one or more embodiments, an event may have a routing key, which may be a string that allows Pravega and/or administrators to determine which events are related (and/or which events may be grouped). A routing key may be derived from data, or it may be an artificial string (e.g., a universally unique identifier) or a monotonically increasing number. For example, a routing key may be a timestamp (to group events together by time), or an IoT sensor identifier (to group events by a machine). In one or more embodiments, a routing key may be useful to define precise read/write semantics. For example, (i) events with the same routing key may be consumed in the order they were written and (ii) events with different routing keys sent to a specific reader will always be processed in the same order even if that reader backs up and re-reads them.

As discussed above, Pravega (e.g., an open-source, distributed and tiered streaming storage system providing a cloud-native streaming infrastructure (i) that is formed by controller instances and SS instances, (ii) that eventually stores stream data in a long-term storage (e.g., 140), (iii) that enables auto-scaling of streams (where a degree of parallelism may change dynamically in order to react workload changes) and its connection with serverless computing, and (iv) that supports both a byte stream (allowing data to be access randomly by any byte offset) and an event stream (allowing parallel writes/reads)) may store and manage/serve data streams, in which the "stream" abstraction in Pravega is a first-class primitive for storing continuous and unbounded data. A data stream in Pravega guarantees strong consistency and achieves good performance (with respect to data storage and management), and may be combined with one or more stream processing engines (e.g., Apache Flink) to initiate streaming applications.

In one or more embodiments, Client A (110A) may concurrently have dynamic write/read access to a stream where other clients (using the streaming storage system (125)) may be aware of all changes being made to the stream. The SS (164) may track data that has been written to the stream. Client A may update the stream by sending a request to the SS that includes the update and a total length of the stream that was written at the time of a last read update by Client A. If the total length of the stream received from Client A matches the actual length of the stream maintained by the SS, the SS may update the stream. If not, a failure message may be sent to Client A and Client A may process more reads to the stream before making another attempt to update the stream.

In one or more embodiments, Client A (110A) may provide a client library that may implement an API for the writer and reader components to use (where an application may use the API to read and write data from and to the storage system). The client library may encapsulate a protocol used for a communication between Client A and Pravega (e.g., the controller (162), the SS (164), etc.). As discussed above, (i) a writer component may be an application that generates events/data and writes them into a stream, in which events may be written by appending to the tail (e.g., front) of the stream; (ii) a reader component may be an application that reads events from a stream, in which the reader component may read from any point in the stream (e.g., a reader component may be reading events from a tail of a stream); and (iii) events may be delivered to a reader component as quickly as possible (e.g., events may be delivered to a reader component within tens of ms after they were written).

In one or more embodiments, segments may be illustrated as "Sn" with n being, for example, 1 through 10. A low number n indicates a segment location closer to a stream head and a high number n indicates a segment location closer to a stream tail. In general, a stream head refers to the smallest offsets of events that have no predecessor (e.g., the beginning of a stream, the oldest data, etc.). Such events may have no predecessor because either such events are the first events written to a stream or their predecessors have been truncated. Likewise, a stream tail refers to the highest offsets of events of an open stream that has no successor (e.g., the most recently written events and/or last events, the end of a stream where new events are appended, etc.). In one or more embodiments, a segment may be (i) an "open segment" indicating that a writer component may write data to that segment and a reader component may consume that data at a later point-in-time, and (ii) a "sealed/immutable segment" indicating that the segment is read-only (e.g., which may not be appended).

As discussed above, a reader component may read from earlier parts (or at an arbitrary position) of a stream (referred to as "catch-up reads", in which catch-up read data may be cached on demand) and a "position object (or simply a "position")" may represent a point in the stream that the reader component is currently located.

As used herein, a "position" may be used as a recovery mechanism, in which an application (of Client A (110A)) that persist the last position of a "failed" reader component that has successfully processed may use that position to initialize a replacement reader to pick up where the failed reader left off. In this manner, the application may provide exactly-once semantics (e.g., exactly-once event processing) in the case of a reader component failure.

In one or more embodiments, multiple reader components may be organized into one or more RGs, in which an RG may be a named collection of readers that together (e.g., in parallel, simultaneously, etc.) read events from a given stream. Each event published into a stream may be guaranteed to be sent to one reader component within an RG. Further, as discussed above, an RG may be a composite RG or a distributed RG, in which the distributed RG may allow a distributed application to read and process data in parallel, such that a massive amount of data may be consumed by a coordinated fleet of reader components in that RG. A reader (or a reader component) in an RG may be assigned zero or more stream segments from which to read (e.g., a segment is assigned to one reader in the RG, which gives the "one segment to one reader" exclusive access), in which the number of stream segments may be balanced to which the reader is assigned. For example, the reader may read from two stream segments while another reader in the RG may only read one stream segment.

In one or more embodiments, reader components may be added to an RG, or reader components fail and may be removed from the RG, and a number of segments in a stream may determine the upper bound of "read" parallelism of readers/reader components within the RG. Further, an application (of Client A (110A)) may be made aware of changes in segments (via the SS (164)). For example, the application may react to changes in the number of segments in a stream (e.g., by adjusting the number of readers in an associated RG) to maintain maximum read parallelism if resources allow.

In one or more embodiments, events may be appended to a stream individually, or may be appended as a stream transaction (no size limit), which is supported by the streaming storage system (125). As used herein, a "transaction" refers to a group/set of multiple events (e.g., a writer component may batch up a bunch of events in the form of a transaction and commit them as a unit into a stream). For example, when the controller (162) invokes committing a transaction (e.g., as a unit into a stream), the group of events included in the transaction may be written (via the writer component) to a stream as a whole (where the transaction may span multiple segments of the stream) or may be abandoned/discarded as a whole (e.g., if the writer component fails). With the use of transactions, a writer component may persist data at a point-in-time, and later decide whether the data should be appended to a stream or abandoned. In one or more embodiments, a transaction may be implemented similar to a stream, in which the transaction may be associated with multiple segments and when an event is published into the transaction, (i) the event itself is appended to a segment of the transaction (where data written to the transaction is just as durable as data written directly to a stream) and (ii) the event may not be visible to a reader component until that transaction is committed. Further, an application may continuously produce results of a data processing operation and use the transaction to durably accumulate the results of the operation.

In one or more embodiments, as being a stateless component, the controller (162) may (further) include functionality to, e.g.: (i) manage the lifecycle of a stream and/or transactions, in which the lifecycle of the stream includes features such as generation, scaling, modification, truncation, and/or deletion of a stream (in conjunction with the SS (164)); (ii) manage a retention policy for a stream that specifies how the lifecycle features are implemented (e.g., requiring periodic truncation); (iii) manage transactions (e.g., generating transactions (e.g., generating transaction segments), committing transactions (e.g., merging transaction segments), aborting transactions (e.g., dropping a transaction segment), etc.); (iv) be dependent on stateful components (e.g., the consensus service (168), the logger (166) (for the write ahead log functionalities)); (v) manage (and authenticate) metadata requests (e.g., get information about a segment, get information about a stream, etc.) received from Client A (110A) (e.g., manage stream metadata); (vi) be responsible for distribution/assignment of SCs into one or more SSs executing on the streaming storage system (125) (e.g., if a new SS (or a new SS instance) is added to the streaming storage system, the controller may perform a reassignment of SCs along all existing SSs to balance/split the workload); (vii) be responsible for making sense of segments; and/or (viii) manage a control plane of the streaming storage system.

In one or more embodiments, although data streams are typically unbounded, truncating them may be desirable in practical real-world scenarios to manage the amount of storage space the data of a stream utilizes relative to a stream storage system. This may particularly be the case where storage capacity is limited. Another reason for truncating data streams may be regulatory compliance, which may dictate an amount of time an application retains data.

In one or more embodiments, a stream may dynamically change over time and, thus, metadata of that stream may change over time as well. Metadata of a stream may include (or specify), for example (but not limited to): configuration information of a segment, history of a segment (which may grow over time), one or more scopes, transaction metadata, a logical structure of segments that form a stream, etc. The controller (162) may store metadata of streams (which may enable exactly-once semantics) in a table segment, which may include an index (e.g., a B+tree index) built on segment attributes (e.g., key-value pairs associated to segments). In one or more embodiments, the corresponding "stream metadata" may further include, for example, a size of a data chunk stored in long-term storage (140) and an order of data in that data chunk (for reading purposes and/or for batch analytics purposes at a later point-in-time).

As used herein, a "scope" may be a string and may convey information to a user/administrator for the corresponding stream (e.g., "FactoryMachines"). A scope may act as a namespace for stream identifiers (e.g., as folders do for files) and stream identifiers may be unique within a scope. Further, a stream may be uniquely identified by a combination of its stream identifier and scope. In one or more embodiments, a scope may be used to separate identifiers by tenants (in a multi-tenant environment), by a department of an organization, by a geographic location, and/or any other categorization a user selects.

One of ordinary skill will appreciate that the controller (162) may perform other functionalities without departing from the scope of the embodiments disclosed herein. The controller (162) may be implemented using hardware, software, or any combination thereof.

In one or more embodiments, as being a stateless component, the SS (164) may (further) include functionality to, e.g.: (i) manage the lifecycle of segments (where the SS may be unaware of streams but may store segment data); (ii) generate, merge, truncate, and/or delete segments, and serve read/write requests received from Client A (110A); (iii) use both a durable log (e.g., 166) and the long-term storage (140) to store data and/or metadata; (iv) append new data to the durable log synchronously before responding to Client A, and write data asynchronously to the long-term storage (which is the primary destination of data); (v) use its cache to serve tail stream reads, to read ahead from the long-term storage, and/or to avoid reading from the durable log when writing to the long-term storage; (vi) monitor the rate of event traffic in each segment individually to identify trends and based on these trends, associate a trend label with the corresponding segment; (vii) make sure that each segment maps to only one SC (via a hash function) at any given time, in which that SS instance may maintain metadata (e.g., a rate of traffic into the related segment locally, a scaling type, a target rate, etc.); (viii) in response to a segment being identified as being either hot or cold, the hot/cold segment state is communicated to a central scaling coordinator component of the controller (162) (in which that component consolidates the individual hot/cold states of multiple segments and calculates a centralized auto-scaling decision for a stream such as by replacing hot segments with multiple new segments and/or replacing multiple cold segments with a consolidated new segment); (ix) be dependent on stateful components (e.g., the consensus service (168), the logger (166) (for the write ahead log functionalities)); (x) manage data paths (e.g., a write path, a read path, etc.); (xi) manage (and authenticate) data requests received from Client A; and/or (xii) manage a data plane of the streaming storage (125) (e.g., implement read, write, and other data plane operations).

One of ordinary skill will appreciate that the SS (164) may perform other functionalities without departing from the scope of the embodiments disclosed herein. The SS (164) may be implemented using hardware, software, or any combination thereof.

In one or more embodiments, a trend label may have one of three values, e.g., "normal", "hot", or "cold". A segment identified as "hot" may be characterized by a traffic trend that is greater than a predetermined target rate of traffic. The target rate may be supplied by a user via predetermined a stream policy (e.g., a stream/scaling policy may be defined on a data stream such that if a segment gets more than the required number of events, it may be divided). A segment identified as "cold" may be characterized by a traffic trend that is less than the target traffic rate. For example, a hot segment may be a candidate for scale-up into two or more new segments (e.g., Segment 2 being split into Segment 4 and Segment 5). As yet another example, a cold segment may be a candidate for scale-down via merger with one or more other cold segments (e.g., Segment 4 and Segment 5 being merged into Segment 6). As yet another example, a normal segment may be a candidate for remaining as a single segment.

In one or more embodiments, a consensus service may be required to have/keep a consistent view/state of a current SC distribution/assignment across the streaming storage systems (executing on the system (e.g., 100, FIG. 1.1)). For example, identifiers of SCs and their assignments may need to be consistent across the streaming storage systems and one way to achieve this is implementing the consensus service. To this end, the consensus service (168) (e.g., Apache Zookeeper) may include functionality to, e.g.: (i) perform one or more coordination tasks (e.g., helping to the controller (162) for the assignment/distribution of SCs to SS instances, helping a split of workloads across segments, etc.), and/or (ii) store no stream metadata.

One of ordinary skill will appreciate that the consensus service (168) may perform other functionalities without departing from the scope of the embodiments disclosed herein. The consensus service (168) may be implemented using hardware, software, or any combination thereof.

In one or more embodiments, SC A (165A) and SC B (165B) may allow users and/or applications to read/access data that was written in SC A and SC B and stored in the long-term storage (140) at the background. In one or more embodiments, SC A and SC B may be useful to perform an active-passive data replication. For example, SC A and SC B are writing data and at the same time, SS A and SS B may serve batch analytics tasks (e.g., batch reads) of data processing applications (of Client A (110A)) (for example, for a better user experience).

Further, the embodiment provided in FIG. 1.2 may utilize the inherent capabilities of the streaming storage system (125) deployed to the IN (e.g., 120, FIG. 1.1) to move data to the long-term storage (140) jointly with the SCs (e.g., 165A, 165B, etc.) as a form of active-passive data replication, which is useful for various different analytics workloads. For example, a user (of Client A (110A)) may perform real-time analytics on stream data (with the help of the logger (166), where the logger may persist the most recently written stream data) and at the same time, the related SCs (e.g., SC A, SC B, etc.) may move the data progressively to the long-term storage (140) (i) for serving batch reads/analytics at a later point-in-time (for example, upon receiving a batch read request from the user) and (ii) for enabling storage tiering capabilities provided by the streaming storage system (e.g., to perform active-passive data replication).

In one or more embodiments, as being part of the tiered storage streaming system (e.g., tier-2 storage), the long-term storage (140) may provide long-term (e.g., near-infinite retention), durable, high read/write throughput (e.g., to perform batch analytics; to perform generate, read, write, and delete operations; erasure coding; etc.) historical stream data storage/protection with near-infinite scale and low-cost. The long-term storage may be, for example (but not limited to): pluggable storage, AWS S3, Apache HDFS, Dell Isilon, Dell ECS, object storage, block storage, file system storage, etc. In one or more embodiments, the long-term storage (140) may be located/deployed outside of the streaming storage system (125), in which asynchronous migration of events from tier-1 storage to tier-2 storage (without affecting the performance of tail reads/writes) may reflect different access patterns to stream data.

In one or more embodiments, the long-term storage (140) may be a fully managed cloud (or local) storage that acts as a shared storage/memory resource that is functional to store unstructured and/or structured data. Further, the long-term storage (140) may also occupy a portion of a physical storage/memory device or, alternatively, may span across multiple physical storage/memory devices.

In one or more embodiments, the long-term storage (140) may be implemented using physical devices that provide data storage services (e.g., storing data and providing copies of previously stored data). The devices that provide data storage services may include hardware devices and/or logical devices. For example, the long-term storage (140) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the long-term storage (140) may include a memory device (e.g., a dual in-line memory device), in which data is stored and from which copies of previously stored data are provided. As yet another example, the long-term storage (140) may include a persistent storage device (e.g., an SSD), in which data is stored and from which copies of previously stored data is provided. As yet another example, the long-term storage (140) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the long-term storage (140) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the long-term storage (140) may store/record unstructured and/or structured data that may include (or specify), for example (but not limited to): a valid (e.g., a granted) request and its corresponding details; an invalid (e.g., a rejected) request and its corresponding details; historical stream data and its corresponding details; content of received/intercepted data packets/chunks; information regarding a sender (e.g., a malicious user, a high priority trusted user, a low priority trusted user, etc.) of data; information regarding the size of intercepted data packets; a mapping table that shows the mappings between an incoming request/call/network traffic and an outgoing request/call/network traffic; a cumulative history of user activity records obtained over a prolonged period of time; a cumulative history of network traffic logs obtained over a prolonged period of time; previously received malicious data access requests from an invalid user; one or more outputs of the processes performed by the controller (162); power consumption of components of the streaming storage system (125); an identifier of a user/customer (e.g., a unique string or combination of bits associated with a particular user); a request received from a user (or a user's account); a geographic location (e.g., a country) associated with the user; a timestamp showing when a specific request is processed by an application; a port number (e.g., associated with a hardware component of a client (e.g., 110N)); a protocol type associated with a port number; computing resource details (including details of hardware components and/or software components) and an IP address details of an IN (e.g., 120, FIG. 1.1) hosting an application where a specific request is processed; an identifier of an application; information with respect to historical metadata (e.g., system logs, applications logs, telemetry data including past and present device usage of one or more computing devices in the system (100), etc.); computing resource details and an IP address of a client that sent a specific request (e.g., to the IN); one or more points-in-time and/or one or more periods of time associated with a data recovery event; data for execution of applications/services (including IN applications and associated endpoints); corpuses of annotated data used to build/generate and train processing classifiers for trained ML models; linear, non-linear, and/or ML model parameters on how to train and/or tune a model; an identifier of a sensor; a product identifier of a client (e.g., 110A); a type of a client; historical sensor data/input (e.g., visual sensor data, audio sensor data, electromagnetic radiation sensor data, temperature sensor data, humidity sensor data, corrosion sensor data, etc., in the form of text, audio, video, touch, and/or motion) and its corresponding details; an identifier of a data item; a size of the data item; a distributed model identifier that uniquely identifies a distributed model; a user activity performed on a data item; a cumulative history of user/administrator activity records obtained over a prolonged period of time; a setting (and a version) of a mission critical application executing on an IN (e.g., 120, FIG. 1.1); an SLA/SLO set by a user; a data protection policy (e.g., an affinity-based backup policy) implemented by a user (e.g., to protect a local data center, to perform a rapid recovery, etc.); a configuration setting of that policy; product configuration information associated with a client; a number of each type of a set of assets protected by an IN; a size of each of the set of assets protected; a number of each type of a set of data protection policies implemented by a user; a job detail of a job (e.g., a data protection job, a data restoration job, a log retention job, etc.) that has been initiated by an IN; a type of the job (e.g., a non-parallel processing job, a parallel processing job, an analytics job, etc.); information associated with a hardware resource set (discussed below) of the IN (e.g., 120, FIG. 1.1); a completion timestamp encoding a date and/or time reflective of a successful completion of a job; a time duration reflecting the length of time expended for executing and completing a job; a backup retention period associated with a data item; a status of a job (e.g., how many jobs are still active, how many jobs are completed, etc.); a number of requests handled (in parallel) per minute (or per second, per hour, etc.) by the streaming storage system (125); a number of errors encountered when handling a job; a documentation that shows how the analyzer performs against an SLO and/or an SLA; information regarding an administrator (e.g., a high priority trusted administrator, a low priority trusted administrator, etc.) related to an analytics job; a workflow (e.g., a policy that dictates how a workload should be configured and/or protected, such as an SQL workflow dictates how an SQL workload should be protected) set (by a user); a type of a workload that is tested/validated by an administrator per data protection policy; a practice recommended by a vendor (e.g., a single data protection policy should not protect more than 100 assets; for a dynamic NAS, maximum one billion files can be protected per day, etc.); one or more device state paths corresponding to a device (e.g., a client); an existing knowledge base (KB) article; a technical support history documentation of a customer/user; a port's user guide; a port's release note; a community forum question and its associated answer; a catalog file of an application upgrade; details of a compatible OS version for an application upgrade to be installed; an application upgrade sequence; a solution or a workaround document for a software failure;

one or more lists that specify which computer-implemented services should be provided to which user (depending on a user access level of a user); a fraud report for an invalid user; a set of SLAs (e.g., an agreement that indicates a period of time required to retain a profile of a user); etc.

In one or more embodiments, information associated with a hardware resource set (e.g., including at least resource related parameters) may specify, for example (but not limited to): a configurable CPU option (e.g., a valid/legitimate vCPU count per IN in the system (100)), a configurable network resource option (e.g., enabling/disabling single-root input/output virtualization (SR-IOV) for the IN (e.g., 120, FIG. 1.1)), a configurable memory option (e.g., maximum and minimum memory per IN in the system (100)), a configurable GPU option (e.g., allowable scheduling policy and/or virtual GPU (vGPU) count combinations per IN in the system (100)), a configurable DPU option (e.g., legitimacy of disabling inter-integrated circuit (I2C) for various INs in the system (100)), a configurable storage space option (e.g., a list of disk cloning technologies across one or more INs in the system (100)), a configurable storage I/O option (e.g., a list of possible file system block sizes across all target file systems), a user type (e.g., a knowledge worker, a task worker with relatively low-end compute requirements, a high-end user that requires a rich multimedia experience, etc.), a network resource related template (e.g., a 10 GB/s BW with 20 ms latency quality of service (QOS) template), a DPU related template (e.g., a 1 GB/s BW vDPU with 1 GB vDPU frame buffer template), a GPU related template (e.g., a depth-first vGPU with 1 GB vGPU frame buffer template), a storage space related template (e.g., a 40 GB SSD storage template), a CPU related template (e.g., a 1 vCPU with 4 cores template), a memory resource related template (e.g., an 8 GB DRAM template), a vCPU count per analytics engine, a virtual NIC (vNIC) count per IN in the system (100), a wake on LAN support configuration (e.g., supported/enabled, not supported/disabled, etc.), a vGPU count per IN in the system (100), a type of a vGPU scheduling policy (e.g., a "fixed share" vGPU scheduling policy), a storage mode configuration (e.g., an enabled high-performance storage array mode), etc.

In one or more embodiments, as being telemetry data, a system log (e.g., a file that records system activities across hardware and/or software components of a client, an internal lifecycle controller log (which may be generated as a result of internal testing of a NIC), etc.) may include (or specify), for example (but not limited to): a type of an asset (e.g., a type of a workload such as an SQL database, a NAS executing on-premises, a VM executing on a multi-cloud infrastructure, etc.) that is utilized by a user; computing resource utilization data (or key performance metrics including estimates, measurements, etc.) (e.g., data related to a user's maximum, minimum, and average CPU utilizations, an amount of storage or memory resource utilized by a user, an amount of networking resource utilized by user to perform a network operation, etc.) regarding computing resources of a client (e.g., 110A); an alert that is triggered in a client (e.g., based on a failed cloud disaster recovery operation (which is initiated by a user), the client may generate a failure alert); an important keyword associated with a hardware component of a client (e.g., recommended maximum CPU operating temperature is 75° C.); a computing functionality of a microservice (e.g., Microservice A's CPU utilization is 26%, Microservice B's GPU utilization is 38%, etc.); an amount of storage or memory resource (e.g., stack memory, heap memory, cache memory, etc.) utilized by a microservice (e.g., executing on a client); a certain file operation performed by a microservice; an amount of networking resource utilized by a microservice to perform a network operation (e.g., to publish and coordinate inter-process communications); an amount of bare metal communications executed by a microservice (e.g., I/O operations executed by the microservice per second); a quantity of threads (e.g., a term indicating the quantity of operations that may be handled by a processor at once) utilized by a process that is executed by a microservice; an identifier of a client's manufacturer; media access control (MAC) information of a client; an amount of bare metal communication executed by a client (e.g., I/O operations executed by a client per second); etc.

In one or more embodiments, an alert (e.g., a predictive alert, a proactive alert, a technical alert, etc.) may be defined by a vendor of a corresponding client (e.g., 110A), by an administrator, by another entity, or any combination thereof. In one or more embodiments, an alert may specify, for example (but not limited to): a medium-level of CPU overheating is detected, a recommended maximum CPU operating temperature is exceeded, etc. Further, an alert may be defined based on a data protection policy.

In one or more embodiments, an important keyword may be defined by a vendor of a corresponding client (e.g., 110A), by a technical support specialist, by the administrator, by another entity, or any combination thereof. In one or more embodiments, an important keyword may be a specific technical term or a vendor specific term that is used in a system log.

In one or more embodiments, as being telemetry data, an application log may include (or specify), for example (but not limited to): a type of a file system (e.g., a new technology file system (NTFS), a resilient file system (ReFS), etc.); a product identifier of an application; a version of an OS that an application is executing on; a display resolution configuration of a client; a health status of an application (e.g., healthy, unhealthy, etc.); warnings and/or errors reported for an application; a language setting of an OS; a setting of an application (e.g., a current setting that is being applied to an application either by a user or by default, in which the setting may be a font option that is selected by the user, a background setting of the application, etc.); a version of an application; a warning reported for an application (e.g., unknown software exception (0xc00d) occurred in the application at location 0x0007d); a version of an OS; a type of an OS (e.g., a workstation OS); an amount of storage used by an application; a size of an application (size (e.g., 5 Megabytes (5 MB), 5 GB, etc.) of an application may specify how much storage space is being consumed by that application); a type of an application (a type of an application may specify that, for example, the application is a support, deployment, or recycling application); a priority of an application (e.g., a priority class of an application, described below); active and inactive session counts; etc.

As used herein, "unhealthy" may refer to a compromised health state (e.g., an unhealthy state), indicating a corresponding entity (e.g., a hardware component, a client, an application, etc.) has already or is likely to, in the future, be no longer able to provide the services that the entity has previously provided. The health state determination may be made via any method based on the aggregated health information without departing from the scope of the embodiments disclosed herein.

In one or more embodiments, a priority class may be based on, for example (but not limited to): an application's tolerance for downtime, a size of an application, a relationship (e.g., a dependency) of an application to other applications, etc. Applications may be classified based on each application's tolerance for downtime. For example, based on the classification, an application may be assigned to one of three classes such as Class I, Class II, and Class III. A "Class I" application may be an application that cannot tolerate downtime. A "Class II" application may be an application that can tolerate a period of downtime (e.g., an hour or other period of time determined by an administrator or a user). A "Class III" application may be an application that can tolerate any amount of downtime.

In one or more embodiments, metadata (e.g., system logs, application logs, etc.) may be obtained (or dynamically fetched) as they become available (e.g., with no user manual intervention), or by an analyzer (not shown) of the IN (e.g., 120, FIG. 1.1) polling a corresponding client (e.g., 110A) (by making schedule-driven/periodic API calls to the client without affecting the client's ongoing production workloads) for newer metadata. Based on receiving the API calls from the analyzer, the client may allow the analyzer to obtain the metadata.

In one or more embodiments, the metadata may be obtained (or streamed) continuously as they generated, or they may be obtained in batches, for example, in scenarios where (i) the analyzer (of the IN) receives a metadata analysis request (or a health check request for a client), (ii) another IN of the system (100) accumulates the metadata and provides them to the analyzer at fixed time intervals, or (iii) the long-term storage (140) stores the metadata and notify the analyzer to access the metadata from the long-term storage. In one or more embodiments, metadata may be access-protected for a transmission from a corresponding client (e.g., 110A) to the analyzer, e.g., using encryption.

While the unstructured and/or structured data are illustrated as separate data structures and have been discussed as including a limited amount of specific information, any of the aforementioned data structures may be divided into any number of data structures, combined with any number of other data structures, and/or may include additional, less, and/or different information without departing from the scope of the embodiments disclosed herein.

Additionally, while illustrated as being stored in the long-term storage (140), any of the aforementioned data structures may be stored in different locations (e.g., in persistent storage of other computing devices) and/or spanned across any number of computing devices without departing from the scope of the embodiments disclosed herein.

In one or more embodiments, the unstructured and/or structured data may be updated (automatically) by third-party systems (e.g., platforms, marketplaces, etc.) (provided by vendors) or by administrators based on, for example, newer (e.g., updated) versions of SLAs being available. The unstructured and/or structured data may also be updated when, for example (but not limited to): a data backup operation is initiated, a set of jobs is received, a data restore operation is initiated, an ongoing data backup operation is fully completed, etc.

In one or more embodiments, the long-term storage (140) may provide an indexing service (e.g., a registration service). That is, data may be indexed or otherwise associated with registration records (e.g., a registration record may be a data structure that includes information (e.g., an identifier associated with data) that enables the recorded data to be accessed). More specifically, an agent of the long-term storage may receive various data related inputs directly (or indirectly) from Client A (110A). Upon receiving, the agent may analyze those inputs to generate an index(es) for optimizing the performance of the long-term storage by reducing a required amount of database access(es) when implementing a request (e.g., a data retrieval request). In this manner, requested data may be quickly located and accessed from the long-term storage using an index of the requested data. In one or more embodiments, an index may refer to a database structure that is defined by one or more field expressions. A field expression may be a single field name such as "user_number". For example, an index (e.g., E41295) may be associated with "user_name" (e.g., Adam Smith) and "user_number" (e.g., 012345), in which the requested data is "Adam Smith 012345".

In one or more embodiments, the unstructured and/or structured data may be maintained by, for example, the IN (e.g., 120, FIG. 1.1). The IN may add, remove, and/or modify those data in the long-term storage (140) to cause the information included in the long-term storage to reflect the latest version of, for example, SLAs. The unstructured and/or structured data available in the long-term storage may be implemented using, for example, lists, tables, unstructured data, structured data, etc. While described as being stored locally, the unstructured and/or structured data may be stored remotely, and may be distributed across any number of devices without departing from the scope of the embodiments disclosed herein.

While the long-term storage (140) has been illustrated and described as including a limited number and type of data, the long-term storage (140) may store additional, less, and/or different data without departing from the scope of the embodiments disclosed herein. In the embodiments described above, the long-term storage (140) is demonstrated as a separate entity; however, embodiments herein are not limited as such. In one or more embodiments, the long-term storage (140) may be a part of the cloud.

One of ordinary skill will appreciate that the long-term storage (140) may perform other functionalities without departing from the scope of the embodiments disclosed herein. The long-term storage (140) may be implemented using hardware, software, or any combination thereof.

Turning now to FIG. 1.3, FIG. 1.3 shows an example use case (where the policy-driven framework/mechanism dictates the behavior of readers in an RG to achieve a specific goal in the way the readers consume stream data) in accordance with one or more embodiments disclosed herein. The embodiment shown in FIG. 1.3 may show a scenario in which the SS (164) hosts a reader group state and multiple stream segments (e.g., Segments 1-3). In this scenario, Client A (110A) may host Reader 1 (R1) (e.g., an application that reads events from a stream (or stream data)), Client N (110N) may host Reader 2 (R2), and IN (120) may host Reader 3 (R3), in which, as being distributed readers, R1-R3 form an RG (in a logical way).

Assume here that Client A (110A), Client N (110N), and IN (120) are distributed across different/distinct zones (e.g., different geographic regions in the world), in which (i) R1 is located in a first zone/location (e.g., a first business operation region (BOR)) of an organization (e.g., United States (US) East), (ii) R2 is located in a second zone of the organization (e.g., US-West), and (iii) R3 is located in a third zone of the organization (e.g., Spain). Further, referring to FIG. 1.3, R1-R3 are augmented to collect static or dynamic metadata (e.g., from a relevant host) that will be used later on to enforce a specific policy (e.g., a user-defined policy).

Each reader is configured to share specific/custom metadata to the other members of the RG (via the reader group state). For example, the metadata shared by R1 (which will be used by a model along with the policy at the RG level)

may include (or specify), but not limited to: details of a hardware resource set of Client A (110A) (e.g., computing resource capabilities/details (including details of hardware components and/or software components) of Client A (110A) hosting R1), an identifier of Client A (110A), an identifier of a user using Client A (110A), zone information or a geographic location of Client A (110A) in the world (which may be manually set by a user/administrator of R1), read latency information associated with Client A (110A) (e.g., the time it takes for R1 to get a response from a corresponding computing device after a read request), information indicating events read/consumed per second by R1, state information indicating which segments has been consumed and/or being consumed by R1 (e.g., Segment 1 is being consumed by R1 (represented by the "event read" arrow pointing R1)) so that no segment is left behind or mistakenly shared with across more than one reader (to make sure that R1-R3 know who is handling which segment), power/energy consumption information of components of Client A (110A) (e.g., Client A's energy consumption per hour), system log of Client A (110A), application log of Client A (110A), a type of Client A (110A), a user activity performed on Client A (110A), a data protection policy implemented by a user on Client A (110A), etc. One of ordinary skill will appreciate that the metadata shared by R2 and R3 may include the same or similar level of detail without departing from the scope of the embodiments disclosed herein.

Further, the metadata shared by a reader may be obtained (or dynamically fetched) as they become available (e.g., with no user manual intervention), or by the SS (164) polling the corresponding computing device (e.g., 110A, 110N, or 120) (by making schedule-driven/periodic API calls to the computing device without affecting the computing device's ongoing production workloads) for newer metadata. Based on receiving the API calls from the SS (164), the computing device may allow the SS (164) to obtain the metadata.

The metadata may be obtained (or streamed) continuously as they generated, or they may be obtained in batches, for example, in scenarios where (i) the SS (164) receives a metadata analysis request (or a health check request for the computing device), (ii) another computing device accumulates the metadata and provides them to the SS (164) at fixed time intervals, or (iii) the long-term storage (e.g., 140, FIG. 1.1) stores the metadata and notify the SS (164) to access the metadata from the long-term storage. In one or more embodiments, metadata may be access-protected for a transmission from a corresponding reader to the SS (164), e.g., using encryption.

Continuing with the discussion, typically, readers within an RG share a state (or state information). Such state represents, at least, the assignments of segments/partitions across the readers and the offset at which a reader is currently reading. As indicated above, the state information (that R1-R3 share) is augmented by including the specific metadata of each reader. Said another way, in addition to the assignment of readers to segments, the metadata (that each reader published about itself) is also considered as part of the "shared" reader group state, in which having R1-R3 share this level of detail paves the way to enforce one or more policies at the RG level (to perform segment assignments across R1-R3 to achieve a specific policy-based goal).

Moreover, RGs in streaming storage systems usually have a mechanism for setting a configuration that may include information of various types, such as, for example, the endpoint to read from, the identifier of the streams to read from, etc. Referring to FIG. 1.3, the configuration of the RG (i.e., the reader group state) is extended to include the policy information (at the RG level) as well as any necessary value/threshold to enforce that policy (to achieve one or more specific goals in how R1-R3 consume stream data). By doing so, R1-R3 have access to the user-defined policy (e.g., a location-aware segment distribution policy, an energy savings policy, etc.). While not limited, such policies (in the configuration) may be expressed via SQL-like syntax, for example: "GROUP BY "reader_location" SELECT MIN AVG ("read_latency")".

In the above policy (which may be defined based on metadata associated with the readers), the administrator may enforce the following goal: consider all the readers in an RG, group the readers by their "reader_location", and select the group of readers reporting the minimum/lowest average "read_latency". Referring to FIG. 1.3, because readers operate across two geographic locations (e.g., U.S. and Spain), the above policy will try to enforce that only the closest group of readers to the data source would be consuming data (thus maximizing data locality while considering compliance related parameters (e.g., in terms of which readers can access the data)).

A compliance related parameter may include (or specify), for example (but not limited to): a General Data Protection Regulation (GDPR) compliance requirement (e.g., different "types" personal data may require different levels of protection, for example, sensitive data (e.g., health data, biometrics data, genetic data, criminal history data, etc.) may be subject to the highest levels of data protection; organizations may get consent (from users or data subjects) to collect personal data (with the level of consent varying according to the type of personal data being collected); an organization that collects personal data for a targeted purpose may not use the collected data for another purpose (such as consumer profiling, which may be considered "non-compliant"); data subjects (i.e., the data subjects whose personal data is being collected) may be able to understand why their data is being collected and how it is being processed, and they may have the right to object, correct, and/or remove the data; etc.); a Sarbanes-Oxley Act (SOX) compliance requirement (e.g., prevent data tampering and monitor for breaches, document activity timelines and encrypt the data, install access tracking controls that may identify breaches, check constantly to ensure defense systems are working, analyze security system data (and improve when needed), implement real-time security breach tracking, grant auditors defense system access for complete transparency, disclose security incidents to auditors for a quick response, report technical difficulties to auditors and avoid stalls, etc.); a Health Insurance Portability and Accountability (HIPAA) compliance requirement (e.g., ensure the confidentiality, integrity, and availability of all protected health information (PHI) in any form (e.g., electronic, paper, oral, etc.); identify and protect against reasonably anticipated security threats; protect against reasonably anticipated, impermissible uses or disclosures; ensure compliance of workforce and business associates; etc.); a Payment Card Industry Data Security Standard (PCI DSS) compliance requirement (unlike HIPAA and GDPR requirements, which are based on governmental regulation(s), PCI DSS compliance requirements are contractual commitments maintained and enforced by the Payment Card Industry Security Standards Council) (e.g., build and maintain a secure network and system; protect cardholder data; maintain a vulnerability management program (e.g., quarterly vulnerability scans, annuals assessments, etc.); implement strong access control measures; regularly monitor and test networks; maintain an information security policy; etc.); a California Consumer Privacy Act (CCPA) compliance requirement (e.g., users may have the right to know what personal data is collected or sold (and for what purpose); users may have access to personal data, to request its deletion, and/or to opt-out being collected or sold; users may have the right to sue companies for data breaches and for privacy failures; etc.); a Personal Information Protection and Electronic Documents Act (PIPEDA) compliance requirement (e.g., an organization may need to obtain its users' consent prior to data collection; an organization may need to uphold transparent personal data policies, and limit data collection to clear and specific purposes; users may need to have the right to access their data and to challenge its accuracy; organizations may be held accountable for data loss or theft; organizations may need to disclose security breaches of personal data to individuals who affected by the breach; etc.); etc.

Another policy (included in the reader group state) may be related to achieving energy savings based on one or more performance requirements. This policy may be implemented to enforce a specific goal in which the minimal number of readers (from the fewest distinct nodes) are obtained to achieve an aggregated read throughput of at least, for example, 10 events per second. By implementing this policy, a minimal number of physical machines (or computing devices) will be executing reader processes (e.g., unnecessary devices will switch to a low-power utilization mode), thus contributing to energy savings during a "workload valley" period (at the expense of some performance penalty).

Continuing with the discussion of FIG. 1.3, to satisfy a user-defined goal (beyond workload balancing), a distributed model (e.g., a policy-driven segment distribution model) is added to the system (e.g., 100, FIG. 1.1), in which (i) each reader operates based on the model (said another way, the model executes on the readers), and (ii) the model understands one or more policies enforced globally (at the RG level) and enforces each policy at the reader level (to manage the behavior/assignment of readers when consuming stream data).

Considering the "data locality" policy discussed above (where the user only wants readers reading from a stream (that includes three segments as Segments 1-3) that are from the "reader_location" indicating the lowest average "read_latency"), R1 and R2 would start reading the stream. As no other reader is available at a first point-in-time, R1 would start reading Segment 1 and R2 would start reading Segments 2 & 3. While reading, R1 and R2 periodically publish metadata (e.g., read latency information, read throughput information, etc.) to the "shared" reader group state (illustrated with dotted two-headed arrows).

At a second point-in-time (which is after the first point-in-time), R3 (hosted by the IN (120)) joins the RG (e.g., to satisfy a failover requirement). At this stage, the average latency of R1 is 50 ms and the average latency of R2 is 100 ms, and the average latency of R3 is unknown. Based on the information (e.g., metadata and policies) available in the reader group state, the distributed model may avoid the greedy strategy with newer readers and assign them some segments. To this end, Segments 1-3 are re-balanced: now, R1 would continue reading Segment 1, R2 would continue reading Segment 2 but stop reading Segment 3 (because, based on the "data locality" policy, R2 knows that R3 is more suitable to read Segment 3), and R3 would start reading Segment 3.

At a third point-in-time (which is after the second point-in-time), R1 (hosted by Client A (110A)) is removed from the RG (e.g., because of computing resource limitations) and reports (to the reader group state) that R1 is no longer available. With this newer metadata reported and based on the "data locality" policy, the distributed model re-evaluates the assignment of segments to the available/active readers. To this end, Segments 1-3 are re-balanced: now, R2 would continue reading Segment 2 and start reading Segment 1 (because, based on the "data locality" policy, R3 knows that R2 is more suitable to read Segment 1), and R3 would continue reading Segment 3.

Referring to FIG. 1.3, the reader group state may be yet another stream of information (in the SS (164)) that stores, shares, and updates metadata published by the readers and policies defined by the users (at the RG level), where (i) metadata published by R1 may be represented as "<R1 (location1, latency1, host_id1, etc.): S1>", (ii) metadata published by R2 may be represented as "<R2 (location2, latency2, host_id2, etc.): S2>", and (iii) metadata published by R3 may be represented as "<R3 (location3, latency3, host_id3, etc.): S3>".

FIGS. 2.1-2.3 show a method for managing policy-driven RGs in accordance with one or more embodiments disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 2.1, the method shown in FIG. 2.1 may be executed by, for example, the above-discussed distributed model (where each reader operates based on the model to achieve user-defined goals while reading data from one or more streams). Other components of the system (100) illustrated in FIG. 1 may also execute all or part of the method shown in FIG. 2.1 without departing from the scope of the embodiments disclosed herein.

In Step 200, the distributed model receives a request from a requesting entity (e.g., an administrator via an administrator terminal, an application, a user of a client, etc.) that wants to initiate a read process across an RG that includes a first reader and a second reader.

In response to receiving the request, as part of that request, and/or in any other manner (e.g., before initiating any computation with respect to the request), the distributed model invokes an SS (e.g., 164, FIG. 1.3) to communicate with the SS. After receiving the SS' confirmation, the distributed model obtains first metadata of the first reader (which is periodically published by the first reader) and second metadata of the second reader (which is periodically published by the second reader) from the SS (more specifically, from the reader group state of the SS). In one or more embodiments, the aforementioned data may be obtained continuously or at regular intervals (e.g., every 10 minutes) (without affecting production workloads of the SS). Further, the aforementioned data may be access-protected for the transmission from, for example, the SS to the distributed model, e.g., using encryption.

In one or more embodiments, the aforementioned data may be obtained as it becomes available or by the distributed model polling the SS (via one or more API calls) for newer information. For example, based on receiving an API call from the distributed model, the SS may allow the distributed model to obtain newer information. Details of the metadata are described above in reference to FIG. 1.3.

In Step 202, in response to receiving the request, as part of that request, and/or in any other manner (e.g., before initiating any computation with respect to the request), the distributed model invokes the SS to communicate with the SS. After receiving the SS' confirmation, the distributed model obtains a policy that is defined by the user. In one or more embodiments, the aforementioned data may be obtained continuously or at regular intervals (e.g., every 10 minutes) (without affecting production workloads of the SS). Further, the aforementioned data may be access-protected for the transmission from, for example, the SS to the distributed model, e.g., using encryption.

In one or more embodiments, the aforementioned data may be obtained as it becomes available or by the distributed model polling the SS (via one or more API calls) for newer information. For example, based on receiving an API call from the distributed model, the SS may allow the distributed model to obtain newer information. Details of the policy are described above in reference to FIG. 1.3.

In Step 204, the distributed model analyzes the first metadata, second metadata, and policy (where the policy dictates how readers hosted by the RG need to read stream data (or corresponding segments)) to infer, at least, the user's goal (e.g., distribute a set of segments to a reader of the RG that complies with the GDPR and a predetermined read latency threshold) and information with respect to the first reader and second reader. In one or more embodiments, the information may specify, for example (but not limited to): a first computing device that hosts the first reader has more computing resource capabilities comparing to the capabilities of a second computing device that hosts the second reader (said another way, the second computing device has relatively restricted hardware and/or software resources when compared to the first computing device); the first reader is located in Zone 1 and the second reader is located in Zone 2; the first computing device hosts a first hardware resource set; the second computing device hosts a second hardware resource set; the first hardware resource set includes hardware resources that are distinct from second hardware resources of the second hardware resource set; etc.

In one or more embodiments, the distributed model may store (temporarily or permanently) the information and user's goal to the long-term storage (e.g., 140, FIG. 1.1).

In Step 206, at a first point-in-time, based on the user's goal and information, the distributed model distributes a first set of segments of the stream data to the first reader and a second set of segments of the stream data to the second reader. In Step 208, based on Step 206, the distributed model makes a first determination (in real-time or near real-time) as to whether the number of readers is changed in the RG. Accordingly, in one or more embodiments, if the result of the first determination is NO, the method may end. If the result of the first determination is YES, the method alternatively proceeds to Step 210.

In Step 210, as a result of the first determination in Step 208 being YES, the distributed model makes a second determination (in real-time or near real-time) as to whether any reader is added to the RG. Accordingly, in one or more embodiments, if the result of the second determination is YES, the method alternatively proceeds to Step 212 of FIG. 2.2. If the result of the second determination is NO, the method alternatively proceeds to Step 218 of FIG. 2.3.

Turning now to FIG. 2.2, the method shown in FIG. 2.2 may be executed by, for example, the above-discussed distributed model. Other components of the system (100) illustrated in FIG. 1 may also execute all or part of the method shown in FIG. 2.2 without departing from the scope of the embodiments disclosed herein.

In Step 212, as a result of the second determination in Step 210 of FIG. 2.1 being YES and after a third reader is added to the RG, the distributed model invokes the SS to communicate with the SS. After receiving the SS' confirmation, the distributed model obtains third metadata of the first reader, fourth metadata of the second reader, and fifth metadata of the third reader. In one or more embodiments, the aforementioned data may be obtained continuously or at regular intervals (e.g., every 10 minutes) (without affecting production workloads of the SS). Further, the aforementioned data may be access-protected for the transmission from, for example, the SS to the distributed model, e.g., using encryption.

In one or more embodiments, the aforementioned data may be obtained as it becomes available or by the distributed model polling the SS (via one or more API calls) for newer information. For example, based on receiving an API call from the distributed model, the SS may allow the distributed model to obtain newer information.

In Step 214, the distributed model analyzes the third metadata, fourth metadata, and fifth metadata to infer, at least, second information with respect to the first reader, second reader, and third reader. In one or more embodiments, the second information may specify, for example (but not limited to): a third computing device that hosts the third reader has more computing resource capabilities comparing to the capabilities of the second computing device and first computing device; the third reader is located in Zone 3; the third computing device hosts a third hardware resource set; the third hardware resource set includes hardware resources that are distinct from the hardware resources of the second and first hardware resource sets; etc.

In one or more embodiments, the distributed model may store (temporarily or permanently) the second information to the long-term storage.

In Step 216, at a second point-in-time (which is after the first point-in-time), based on the user's goal and second information, the distributed model re-distributes the first set of segments of the stream data to the second reader and second set of segments of the stream data to the third reader. In one or more embodiments, the method may end following Step 216.

Turning now to FIG. 2.3, the method shown in FIG. 2.3 may be executed by, for example, the above-discussed distributed model. Other components of the system (100) illustrated in FIG. 1 may also execute all or part of the method shown in FIG. 2.3 without departing from the scope of the embodiments disclosed herein.

In Step 218, as a result of the second determination in Step 210 of FIG. 2.1 being NO and after the second reader is removed from the RG, the distributed model invokes the SS to communicate with the SS. After receiving the SS' confirmation, the distributed model obtains sixth metadata of the first reader. In one or more embodiments, the aforementioned data may be obtained continuously or at regular intervals (e.g., every 10 minutes) (without affecting production workloads of the SS). Further, the aforementioned data may be access-protected for the transmission from, for example, the SS to the distributed model, e.g., using encryption.

In one or more embodiments, the aforementioned data may be obtained as it becomes available or by the distributed model polling the SS (via one or more API calls) for newer information. For example, based on receiving an API call from the distributed model, the SS may allow the distributed model to obtain newer information.

In Step 220, the distributed model analyzes the sixth metadata to infer, at least, third information with respect to the first reader. In one or more embodiments, the distributed model may store (temporarily or permanently) the third information to the long-term storage. In Step 222, at a third point-in-time (which is after the second point-in-time), based on the user's goal and third information, the distributed model re-distributes the first set of segments and second set of segments of the stream data to the first reader.

Thereafter, the distributed model initiates notification of the user about the re-distributed set of segments among the readers of the RG. The notification may include, for example (but not limited to): for what purpose the re-distribution is performed, the type parameters that has been taken into account while re-distributing the set of segments, the amount of time that has been spent while performing the re-distribution, etc.

In one or more embodiments, the notification may also indicate whether the re-distribution was completed within the predetermined window, or whether the re-distribution was completed after exceeding the predetermined window. The notification may be displayed on a GUI of the corresponding client. In one or more embodiments, the method may end following Step 222.

Turning now to FIG. 3, FIG. 3 shows a diagram of a computing device in accordance with one or more embodiments disclosed herein.

In one or more embodiments disclosed herein, the computing device (300) may include one or more computer processors (302), non-persistent storage (304) (e.g., volatile memory, such as RAM, cache memory), persistent storage (306) (e.g., a non-transitory computer readable medium, a hard disk, an optical drive such as a CD drive or a DVD drive, a Flash memory, etc.), a communication interface (312) (e.g., Bluetooth interface, infrared interface, network interface, optical interface, etc.), an input device(s) (310), an output device(s) (308), and numerous other elements (not shown) and functionalities. Each of these components is described below.

In one or more embodiments, the computer processor(s) (302) may be an integrated circuit for processing instructions. For example, the computer processor(s) (302) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (e.g., a LAN, a WAN, Internet, mobile network, etc.) and/or to another device, such as another computing device.

In one or more embodiments, the computing device (300) may include one or more output devices (308), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

One or more embodiments disclosed herein may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing a reader group (RG), the method comprising:
    obtaining a first metadata of a first reader (FR) and a second metadata of a second reader (SR), wherein the FR and the SR are a part of the RG;
    obtaining a policy that is defined by a user;
    analyzing the first metadata, the second metadata, and the policy to infer, at least, a goal of the user and information with respect to the FR and the SR;
    distributing, based on the goal and the information, a first set of segments of a stream data to the FR and a second set of segments of the stream data to the SR;
    making, after the distributing, a first determination that a number of readers in the RG is changed;
    making, based on the first determination, a second determination that a third reader (TR) is added to the RG;
    obtaining, based on the second determination, a third metadata of the FR, a fourth metadata of the SR, and a fifth metadata of the TR;
    analyzing the third metadata, the fourth metadata, and the fifth metadata to infer, at least, second information with respect to the FR, the SR, and the TR;
    re-distributing, based on the goal and the second information, the first set of segments to the SR and the second set of segments to the TR; and
    initiating, via a graphical user interface, a notification of the user about the re-distributing.

2. The method of claim 1, wherein the stream data is a continuous, unbounded, append-only, and durable sequence of bytes.

3. The method of claim 1,
    wherein a segment store of a streaming storage system hosts the first metadata, the second metadata, the third metadata, the fourth metadata, the fifth metadata, and the policy,
    wherein the segment store comprises, at least, a first segment container and a second segment container, and
    wherein the first segment container hosts the first set of segments and the second segment container hosts the second set of segments.

4. The method of claim 3,
    wherein the streaming storage system comprises a tier-1 storage and a tier-2 storage,
    wherein the tier-1 storage is a distributed write-ahead log providing short-term, durable, and low-latency data protection of the stream data, and
    wherein the tier-2 storage is a pluggable object storage providing long-term and durable data protection of the stream data.

5. The method of claim 1,
    wherein the FR is located in a first zone, the SR is located in a second zone, and the TR is located in a third zone, wherein the first zone, the second zone, and the third zone are distinct zones, and wherein the first zone is a first geographic region in the world, the second zone is a second geographic region in the world, and the third zone is a third geographic region in the world.

6. The method of claim 1, wherein the goal is distributing the first set of segments to a reader of the RG that complies with a general data protection regulation and a predetermined read latency threshold.

7. The method of claim 1, wherein the policy dictates how readers hosted by the RG need to read the stream data.

8. The method of claim 1, wherein a first computing device (CD) that hosts the FR comprises a first hardware resource set, the second CD that hosts the SR comprises a second hardware resource set, and a third CD that hosts the TR comprises a third hardware resource set, wherein the first CD, the second CD, and the third CD are operably connected to each other over a network, and wherein the first hardware resource set comprises hardware resources that are distinct from second hardware resources of the second hardware resource set and third hardware resources of the third hardware resource set.

9. The method of claim 8, wherein the first hardware resource set specifies at least one selected from a group consisting of a minimum user count, a maximum user count, a central processing unit configuration, a speed select technology configuration, a hardware virtualization configuration, and an input/output memory management unit configuration.

10. The method of claim 8, wherein the second hardware resource set specifies at least one selected from a group consisting of a minimum user count, a maximum user count, a swap space configuration, a reserved memory configuration, and a memory ballooning configuration.

11. The method of claim 8, wherein the third hardware resource set specifies at least one selected from a group consisting of a minimum user count, a maximum user count, a graphics processing unit (GPU) configuration, a type of a GPU scheduling policy, and a second type of a GPU virtualization approach that needs to be implemented.

12. The method of claim 8, wherein the first metadata specifies at least one of the first hardware resource set, an identifier of the first CD, a geographic location of the FR in the world, and a read latency information associated with the FR.

13. The method of claim 1, wherein the information specifies at least computing resource capabilities of a computing device that hosts the FR.

14. A method for managing a reader group (RG), the method comprising:

obtaining a first metadata of a first reader (FR) and a second metadata of a second reader (SR), wherein the FR and the SR are a part of the RG;

obtaining a policy that is defined by a user;

analyzing the first metadata, the second metadata, and the policy to infer, at least, a goal of the user and information with respect to the FR and the SR;

distributing, based on the goal and the information, a first set of segments of a stream data to the FR and a second set of segments of the stream data to the SR;

making, after the distributing, a first determination that a number of readers in the RG is changed;

making, based on the first determination, a second determination that the SR is removed from the RG;

obtaining, based on the second determination, a third metadata of the FR;

analyzing the third metadata to infer, at least, second information with respect to the FR;

re-distributing, based on the goal and the second information, the second set of segments to the FR; and initiating, via a graphical user interface, a notification of the user about the re-distributing.

15. The method of claim 14, wherein the goal is distributing the first set of segments to a reader of the RG that complies with a general data protection regulation and a predetermined read latency threshold.

16. The method of claim 14, wherein the policy dictates how readers hosted by the RG need to read the stream data.

17. The method of claim 14, wherein a first computing device (CD) that hosts the FR comprises a first hardware resource set, the second CD that hosts the SR comprises a second hardware resource set, and a third CD that hosts the TR comprises a third hardware resource set, wherein the first CD, the second CD, and the third CD are operably connected to each other over a network, and wherein the first hardware resource set comprises hardware resources that are distinct from second hardware resources of the second hardware resource set and third hardware resources of the third hardware resource set.

18. The method of claim 14, wherein the FR is located in a first zone, the SR is located in a second zone, and the TR is located in a third zone, wherein the first zone, the second zone, and the third zone are distinct zones, and wherein the first zone is a first geographic region in the world, the second zone is a second geographic region in the world, and the third zone is a third geographic region in the world.

19. The method of claim 14, wherein a segment store of a streaming storage system hosts the first metadata, the second metadata, the third metadata, the fourth metadata, the fifth metadata, and the policy, wherein the segment store comprises, at least, a first segment container and a second segment container, and wherein the first segment container hosts the first set of segments and the second segment container hosts the second set of segments.

20. A non-transitory computer-readable medium comprising computer-readable program code, which when executed by a computer processor enables the computer processor to perform a method for managing a reader group (RG), the method comprising:

obtaining a first metadata of a first reader (FR) and a second metadata of a second reader (SR), wherein the FR and the SR are a part of the RG;

obtaining a policy that is defined by a user;

analyzing the first metadata, the second metadata, and the policy to infer, at least, a goal of the user and information with respect to the FR and the SR;

distributing, based on the goal and the information, a first set of segments of a stream data to the FR and a second set of segments of the stream data to the SR;

making, after the distributing, a first determination that a number of readers in the RG is changed;

making, based on the first determination, a second determination that a third reader (TR) is added to the RG;

obtaining, based on the second determination, a third metadata of the FR, a fourth metadata of the SR, and a fifth metadata of the TR;

analyzing the third metadata, the fourth metadata, and the fifth metadata to infer, at least, second information with respect to the FR, the SR, and the TR;

re-distributing, based on the goal and the second information, the first set of segments to the SR and the second set of segments to the TR; and initiating, via a graphical user interface, a notification of the user about the re-distributing.

\* \* \* \* \*